(12) United States Patent
Lange

(10) Patent No.: US 11,362,728 B2
(45) Date of Patent: *Jun. 14, 2022

(54) DIGITAL MULTICHANNEL INTERFACE WITHIN A RADIO DISTRIBUTION SYSTEM

(71) Applicant: CommScope Technologies LLC, Hickory, NC (US)

(72) Inventor: Keld Knut Lange, Oetisheim (DE)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/995,519

(22) Filed: Aug. 17, 2020

(65) Prior Publication Data

US 2020/0382199 A1 Dec. 3, 2020

Related U.S. Application Data

(63) Continuation of application No. 15/520,792, filed as application No. PCT/US2015/032674 on May 27, 2015, now Pat. No. 10,749,590.

(Continued)

(51) Int. Cl.
*H04B 7/155* (2006.01)
*H04W 56/00* (2009.01)

(52) U.S. Cl.
CPC ........ *H04B 7/155* (2013.01); *H04W 56/0015* (2013.01); *H04W 56/00* (2013.01)

(58) Field of Classification Search
None
See application file for complete search history.

(56) References Cited

U.S. PATENT DOCUMENTS

| 5,890,055 | A | 3/1999 | Chu et al. |
| 10,749,590 | B2 | 8/2020 | Lange |

(Continued)

FOREIGN PATENT DOCUMENTS

EP 2568755 A1 3/2013

OTHER PUBLICATIONS

Australian Government IP Australia, "Examination report No. 1 from AU Application No. 2015340023 dated Apr. 10, 2019", from Foreign Counterpart to U.S. Appl. No. 15/520,792, pp. 1-4, Published: AU.

(Continued)

*Primary Examiner* — Jamaal Henson
(74) *Attorney, Agent, or Firm* — Fogg & Powers LLC

(57) ABSTRACT

A digital multichannel interface for a first unit of a radio distribution system, the digital multichannel interface comprising a first uplink interface and a first downlink interface. The first uplink interface is configured to receive uplink transmit frames from a second unit of the radio distribution system, the uplink transmit frames including frame timing information, the radio distribution system including a plurality of remote units communicatively coupled to at least one of the first unit or the second unit. The first downlink interface is configured to: generate a plurality of reformatted wideband downlink I/Q data streams based on the frame timing information extracted from the uplink transmit frames received from the second unit; generate downlink transmit frames including the plurality of reformatted wideband downlink I/Q data streams; and provide the downlink transmit frames to the second unit.

20 Claims, 14 Drawing Sheets

Related U.S. Application Data

(60) Provisional application No. 62/073,227, filed on Oct. 31, 2014.

(56) References Cited

U.S. PATENT DOCUMENTS

| | | |
|---|---|---|
| 2005/0172198 A1 | 8/2005 | Millar |
| 2006/0039330 A1 | 2/2006 | Hackett et al. |
| 2007/0091896 A1* | 4/2007 | Liu ............... H04J 3/1617 370/395.5 |
| 2008/0181282 A1 | 7/2008 | Wala et al. |
| 2008/0199183 A1* | 8/2008 | Liu ............... H04J 3/0682 398/103 |
| 2009/0092117 A1* | 4/2009 | Jiang ............. H04W 88/10 370/342 |
| 2009/0180407 A1 | 7/2009 | Sabat et al. |
| 2009/0180426 A1 | 7/2009 | Sabat et al. |
| 2010/0093084 A1* | 4/2010 | Xu ................. B82Y 5/00 435/375 |
| 2010/0278530 A1* | 11/2010 | Kummetz ...... H04B 10/2575 398/41 |
| 2011/0194510 A1 | 8/2011 | Gaal et al. |
| 2011/0222434 A1 | 9/2011 | Chen |
| 2011/0275376 A1 | 11/2011 | Boldi et al. |
| 2012/0057572 A1* | 3/2012 | Evans ............. H04W 88/085 370/338 |
| 2012/0176966 A1* | 7/2012 | Ling ............... H04W 88/085 370/328 |
| 2012/0315048 A1 | 12/2012 | Beck et al. |
| 2012/0315078 A1* | 12/2012 | Chou ............. A46B 11/0082 401/276 |
| 2013/0129009 A1 | 5/2013 | Ranson et al. |
| 2013/0272217 A1* | 10/2013 | Negus ............ H04W 72/0486 370/329 |
| 2014/0031049 A1* | 1/2014 | Sundaresan ...... H04W 84/042 455/447 |
| 2014/0105101 A1 | 4/2014 | Vu et al. |
| 2014/0146797 A1 | 5/2014 | Zavadsky et al. |

OTHER PUBLICATIONS

U.S. Patent and Trademark Office, "Office Action", U.S. Appl. No. 15/520,792, dated Dec. 18, 2018, pp. 1-27, Published: US.

European Patent Office, "Communication pursuant to Article 94(3) from EP Application No. 15854779.4", from Foreign Counterpart to U.S. Appl. No. 15/520,792, dated Nov. 15, 2019, pp. 1-5, Published: EP.

European Patent Office, "Extended European Search Report from EP Application No. 15854779.4 dated May 23, 2018", "From Foreign Counterpart of U.S. Appl. No. 15/520,792", dated May 23, 2018, pp. 1-9, Published in: EP.

International Search Authority, "International Search Report and Written Opinion from PCT Application No. PCT/US2015/032674", from Foreign Counterpart to U.S. Appl. No. 15/520,792, dated Aug. 27, 2015, pp. 1-12, Published in: WO.

State Intellectual Property Office, "Office Action from CN Application No. 201580055767.7 dated Jul. 29, 2019", from Foreign Counterpart to U.S. Appl. No. 15/520,792, pp. 1-23, Published: CN.

U.S. Patent and Trademark Office, "Final Office Action", U.S. Appl. No. 15/520,792, dated Jun. 7, 2019, pp. 1-26, Published: US.

U.S. Patent and Trademark Office, "Notice of Allowance", U.S. Appl. No. 15/520,792, dated Apr. 13, 2020, pp. 1 through 16, Published: US.

U.S. Patent and Trademark Office, "Office Action", U.S. Appl. No. 15/520,792, dated Dec. 13, 2019, pp. 1-16, Published: US.

U.S. Patent and Trademark Office, "Advisory Action", U.S. Appl. No. 15/520,792, dated Sep. 3, 2019, pp. 1 through 3, Published: US.

European Patent Office, "Summonts to attend oral proceedings pursuant to Rule 115(1) EPC from EP Application No. 15854779.4", from Foreign Counterpart to U.S. Appl. No. 15/520,792, Mar. 22, 2021, pp. 1 through 7, Published: EP.

European Patent Office, "Communication under Rule 71(3) EPC from EP Application No. 15854779.4", from Foreign Counterpart to U.S. Appl. No. 16/995,519, dated Nov. 24, 2021, pp. 1 through 61, Published: EP.

\* cited by examiner

DIGITAL MULTICHANNEL INTERFACE WITHIN A RADIO DISTRIBUTION SYSTEM

CROSS-REFERENCE TO RELATED APPLICATIONS

This application is a continuation application of U.S. patent application Ser. No. 15/520,792 filed Apr. 20, 2017 and entitled "MULTICHANNEL I/Q INTERFACE BETWEEN A BASE STATION AND A REPEATER" (currently pending), which application is a U.S. National Stage application of PCT Application Serial No. PCT/US2015/032674 filed May 27, 2015 and entitled "MULTICHANNEL I/Q INTERFACE BETWEEN A BASE STATION AND A REPEATER", which claims the benefit of U.S. Provisional Application Ser. No. 62/073,227 filed Oct. 31, 2014, the contents of all of which are hereby incorporated by reference.

TECHNICAL FIELD

The disclosure relates generally to telecommunications and, more particularly (although not necessarily exclusively), to a digital multichannel interface between a base station and a repeater unit.

BACKGROUND

A DAS can be used to extend wireless coverage in an area through the use of one or more repeaters and multiple remote units coupled to each repeater. Repeaters can be coupled to one or more base stations that can each manage wireless communications for different cell sites. A repeater can receive downlink signals from the base station and distribute downlink signals in analog or digital form to one or more remote units. The remote units can transmit the downlink signals to user equipment devices within coverage areas serviced by the remote units. In the uplink direction, signals from user equipment devices may be received by the remote units. The remote units can transmit the uplink signals received from user equipment devices to the repeater. The repeater can transmit uplink signals to the serving base stations.

A base station can include a digital baseband unit and a radio transceiver unit that communicate using a digital optical interface. Industry communication standards, such as the Open Base Station Architecture Initiative ("OBSAI") or Common Public Radio Interface ("CPRI") standards, can be used to implement the digital optical interface between the digital baseband unit and radio transceiver unit. For example, the baseband unit of a base station can include several CPRI output ports. Each port can be input into various radio transceiver units.

The radio transceiver units of the base station can interface with a repeater using a radio frequency communication link. To communicate with the repeater, each radio transceiver unit in the base station can include hardware for signal processing and digital-to-analog conversion of incoming single carrier I/Q and control data streams to RF signals output at antenna ports. The use of a radio frequency communication link between the base station and the repeater can lead to higher equipment costs and increased power consumption due to the signal processing for digital-to-analog conversion and high powered RF amplification.

SUMMARY

In one aspect, a digital multichannel interface for a base station is provided. The digital multichannel interface for the base station can include a base station downlink interface. The base station downlink interface can receive multiple raw downlink I/Q data streams from a digital baseband unit via a digital front end and receive frame timing information. The frame timing information can be extracted from uplink transmit frames received from a repeater unit by a base station uplink interface in the base station. The base station downlink interface can also generate downlink transmit frames including a plurality of reformatted wideband downlink I/Q data streams according to the frame timing information and provide the downlink transmit frames to the repeater unit.

In another aspect, a digital multichannel interface for a repeater unit is provided. The digital multichannel interface for the repeater unit can include a repeater uplink interface that can receive frame timing information extracted from downlink transmit frames received from a base station by a repeater downlink interface in the repeater. The repeater uplink interface can also generate uplink transmit frames including a plurality of reformatted wideband uplink I/Q data streams according to the frame timing information and provide the uplink transmit frames to a base station uplink interface.

In another aspect, a method is provided. The method can involve a base station downlink interface receiving multiple raw wideband downlink I/Q data streams. The method can also involve the base station downlink interface receiving a base station framing clock signal that includes frame timing information generated at a repeater unit. The method can further involve generating downlink transmit frames by multiplexing the reformatted wideband downlink I/Q data streams according to the frame timing information included in the base station framing clock signal. The method can also involve transmitting the downlink transmit frames to the repeater unit.

In another aspect, a digital multichannel interface for a base station is provided. The digital multichannel interface can include a base station downlink interface configured to receive multiple raw wideband downlink I/Q data streams from a digital front end. The digital front end interfaces with a baseband unit of the base station. The digital multichannel interface can also generate serialized reformatted wideband downlink I/Q data streams by sampling the plurality of wideband downlink I/Q data streams and multiplexing the sampled plurality of wideband downlink I/Q data streams. The digital multichannel interface can further provide the serialized reformatted wideband downlink I/Q data streams to a repeater downlink interface of a repeater unit. The repeater unit can be configured to transmit information carried by the serialized reformatted wideband downlink I/Q data streams to one or more remote units configured to provide the downlink I/Q data streams to user equipment devices.

DETAILED DESCRIPTION

Figure 1:
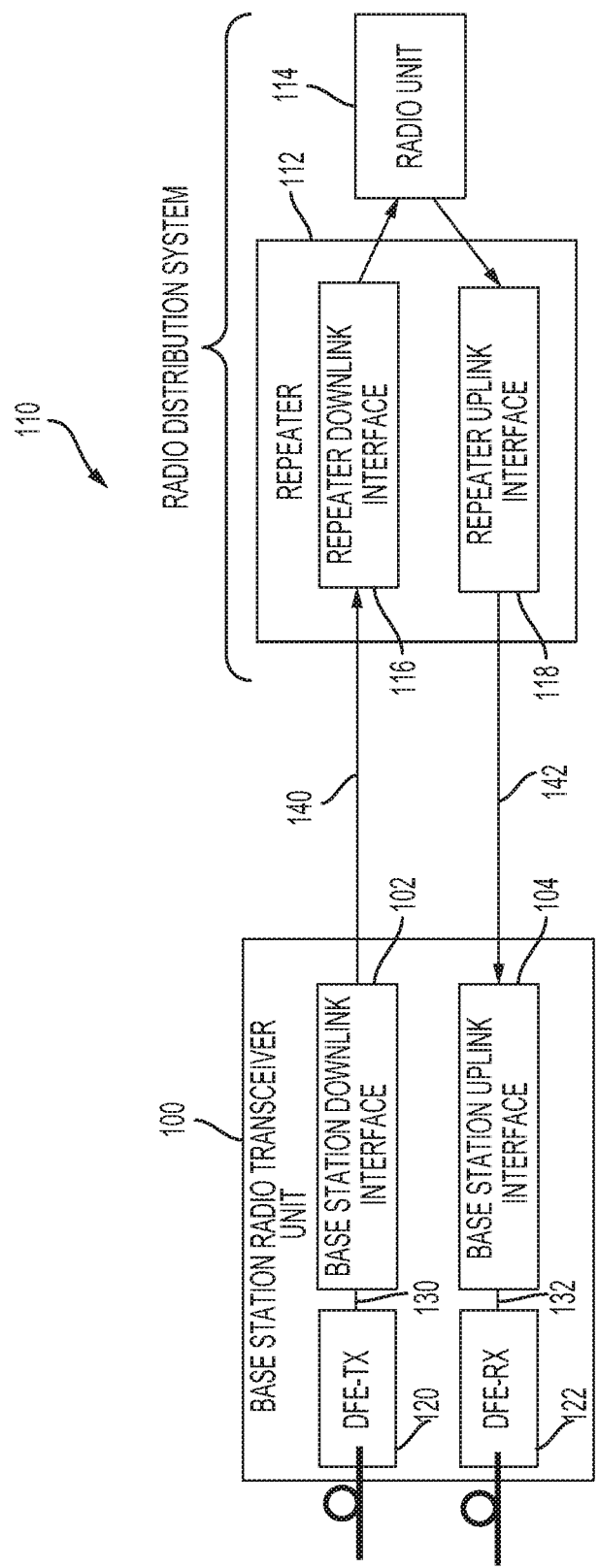
FIG. 1 is a block diagram that depicts an example of a base station radio transceiver unit and a radio distribution system communicatively coupled via a multichannel I/Q interface according to one aspect of the present disclosure.

Certain aspects and features relate to a digital multichannel I/Q interface between a base station and a radio distribution unit, such as a head-end unit, active antenna, or a repeater in a telecommunications system, such as a distributed antenna system ("DAS"). The multichannel I/Q interface can transport multiple digitized complex baseband signals (e.g., streams of I/Q samples) and semi-static control information between a base station and a repeater. The streams of I/Q samples can include information from multiple carriers of a wideband signal.

For example, the radio transceiver unit of a base station can include a downlink interface that receives downlink wireless communication information from the baseband portion of the base station. The radio transceiver unit can receive multiple I/Q streams carrying wireless communication and control information from the base station via various radio interface standards. For example, the radio transceiver unit can receive I/Q streams via the Common Public Radio Interface ("CPRI") standard or the Open Base Station Architecture Initiative ("OBSAI") standard. Each I/Q stream can carry wireless communication and control information for a respective antenna port.

A Digital Front End ("DFE") transmit module at the radio transceiver unit can generate raw wideband I/Q data streams and control information from the I/Q streams provided from the base station. The radio transceiver unit can reformat the raw wideband I/Q data streams by scaling and sampling the data streams. The radio transceiver unit can serialize the reformatted wideband I/Q data streams and control information and provide the serialized reformatted wideband I/Q data streams and control information as transmit frames to a downlink interface of a repeater. The semi-static control information between the base station to the repeater can include alarm and status information for one or more of the forward and the reverse link.

The repeater can de-serialize the I/Q data streams and control information and use the reformatted wideband I/Q samples to retrieve the wideband signal information. On the uplink side, the repeater can serialize reformatted wideband I/Q data streams and control information, determine framing signals, and generate uplink transmit frames that contain the serialized reformatted wideband I/Q data streams and control information based on the framing information. The repeater can provide the uplink transmit frames carrying the serialized reformatted wideband I/Q information and control information to the radio transceiver unit of the base station. A free running frame generator at one or more of the base station or the repeater unit can generate framing signals that carry frame timing information for synchronizing the uplink transmit frames and downlink transmit frames. The free running frame generator can be included, for example, in the digital baseband unit of the base station, the radio transceiver unit of the base station, or the repeater unit. A free running framing generator can continually generate frames at a given clock rate.

The multichannel I/Q interface can transport digital I/Q streams carrying raw wideband signals in a complex baseband signal representation as well as control information between the base station and the repeater. A multichannel I/Q interface between a base station and a repeater can help reduce implementation costs and reduce overall system power consumption by removing the need for complex signal processing hardware (e.g. digital pre-distortion, digital-to-analog conversion and RF amplification used in a radio frequency interface between a base station and a repeater).

Different examples of a multichannel I/Q interface between a base station and a repeater are disclosed. For example, a multichannel I/Q interface can be used in a multiple-input and multiple-output ("MIMO") configuration for a base station with beam-steering capabilities. A MIMO configuration for beam-steering can include a configuration in which different I/Q channels are associated with respective antenna elements. For example, a dual matrix of having five sets of four antenna elements can support 40 I/Q channels. In other aspects, the multichannel I/Q interface described herein can be used to report key performance indicators ("KPI") for self-optimizing network features.

In some aspects, the multichannel I/Q interface can be adapted to 10-Gbit interfaces (optical or electrical), such as a 10-Gbit Ethernet interface. In other aspects, the multichannel I/Q interface can be adapted to interfaces with higher data rates, such as a 28-Gbit single channel interface or a 100 Gbit quad channel (channel bonding of four 25-Gbit channel) interface. The I/Q samples and control information can be multiplexed on a common communication link. In some aspects, the control information can be provided on a separate communication link.

These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

FIG. 1 is a block diagram that depicts an example of a base station radio transceiver unit 100 and a radio distribution system 110 communicatively coupled via a multichannel I/Q interface. The base station radio transceiver unit 100 can include a DFE-TX block 120 that can receive multiple I/Q streams carrying wideband communication information and control information from the digital baseband unit of the base station. The DFE-TX block 120 can process the multiple I/Q streams received from the digital baseband unit by increasing the sampling rate of the I/Q streams and passing the I/Q streams through multiple filter stages, mixers, or modulators, resulting in raw wideband downlink I/Q data streams in a format suitable for the multichannel I/Q interface. The DFE-TX block 120 can provide the raw wideband downlink I/Q data streams and control information 130 to a base station downlink interface 102 included in the base station radio transceiver unit 100. The base station downlink interface 102 can reformat the raw wideband downlink I/Q data streams and control information 130 by the use of multipliers and sample rate converters to scale and sample the I/Q and control information. The base station downlink interface 102 can multiplex the individual reformatted wideband I/Q data streams and control information. The base station downlink interface 102 can serialize and output the reformatted wideband downlink multichannel I/Q samples and control signals 140 to the radio distribution system 110. The base station radio transceiver unit 100 can also include a base station uplink interface 104 that can receive reformatted wideband uplink multichannel I/Q samples and control signals 142 from the radio distribution system 110. The base station uplink interface 104 can de-serialize and generate raw wideband uplink I/Q data streams and control information 132 to a DFE-RX block 122 included in the base station radio transceiver unit 100. The DFE-RX block 122 can transmit raw wideband uplink I/Q data streams carrying the wideband communication information and control information to the digital baseband unit of the base station.

The radio distribution system 110 can include a repeater 112 and a radio unit 114. The repeater 112 can include any radio distribution device for transporting signals between the base station radio transceiver unit 100 and the radio unit 114. The repeater 112 can also be referred to as a head-end unit. The radio unit 114 can include any remote radio unit for providing signals from the repeater 112 to mobile devices within the coverage zone of the radio unit 114. While FIG. 1 depicts one repeater 112 and one radio unit 114, the radio distribution system 110 can include multiple repeaters and radio units for communicating with mobile devices.

The repeater 112 in the radio distribution system 110 can include a repeater downlink interface 116 and a repeater uplink interface 118. The radio distribution system 110 can receive reformatted wideband downlink multichannel I/Q samples and control signals 140 via the repeater downlink interface 116. The radio distribution system 110 can serialize and output reformatted wideband uplink multichannel I/Q samples 142 via the repeater uplink interface 118. A radio unit 114 in the radio distribution system 110 can process the reformatted wideband multi-channel I/Q samples for wireless communication with user equipment (e.g. mobile phones and other mobile devices) connected to the DAS. The base station downlink interface 102, base station uplink interface 104, repeater downlink interface 116, and repeater uplink interface 118 can collectively refer to the digital multichannel I/Q interface as discussed in aspects herein.

Figure 2:
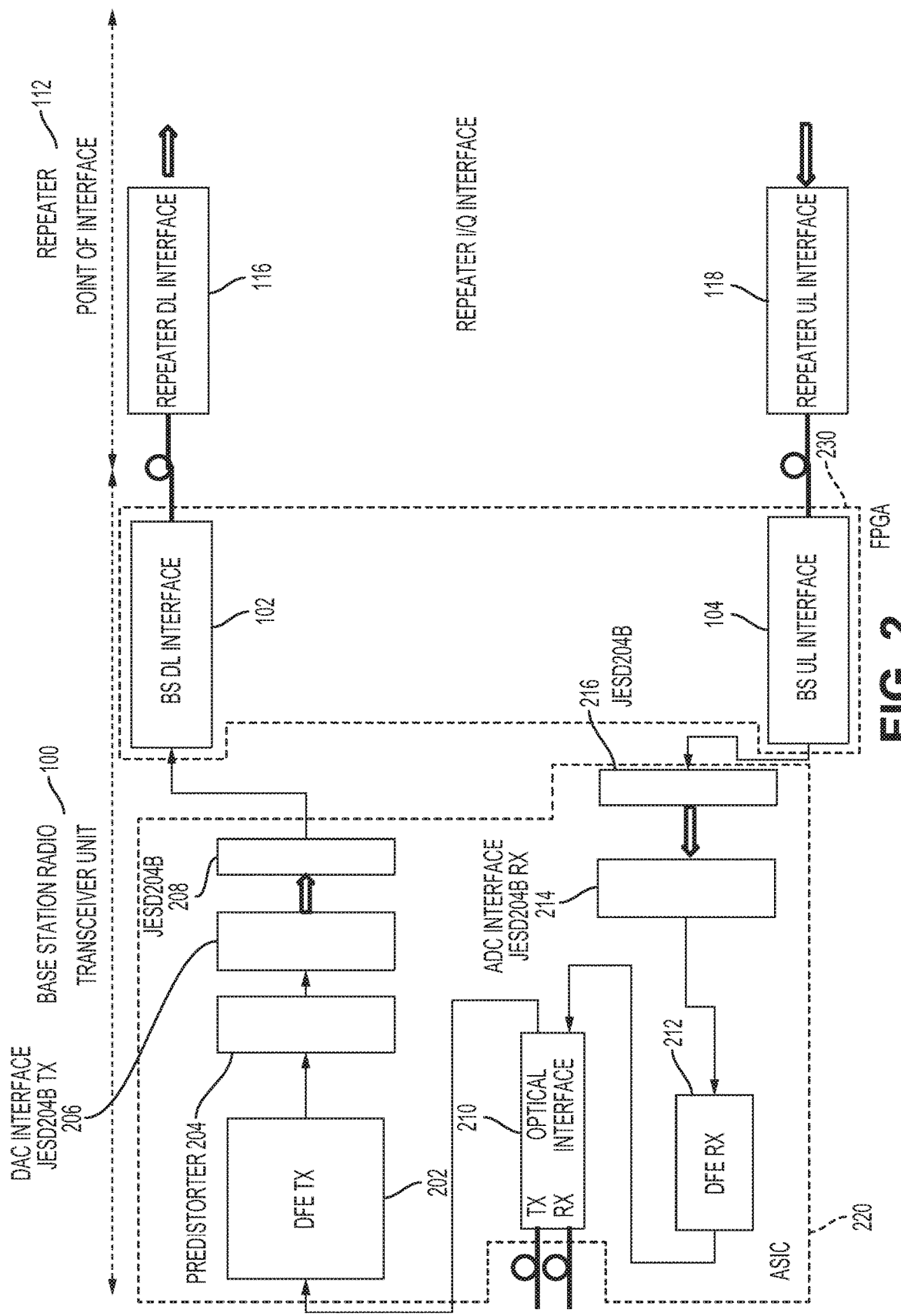
FIG. 2 is a block diagram that depicts an example of a multichannel I/Q interface between a base station radio transceiver unit and the point of interface of a repeater unit according to one aspect of the present disclosure.
Figure 3:
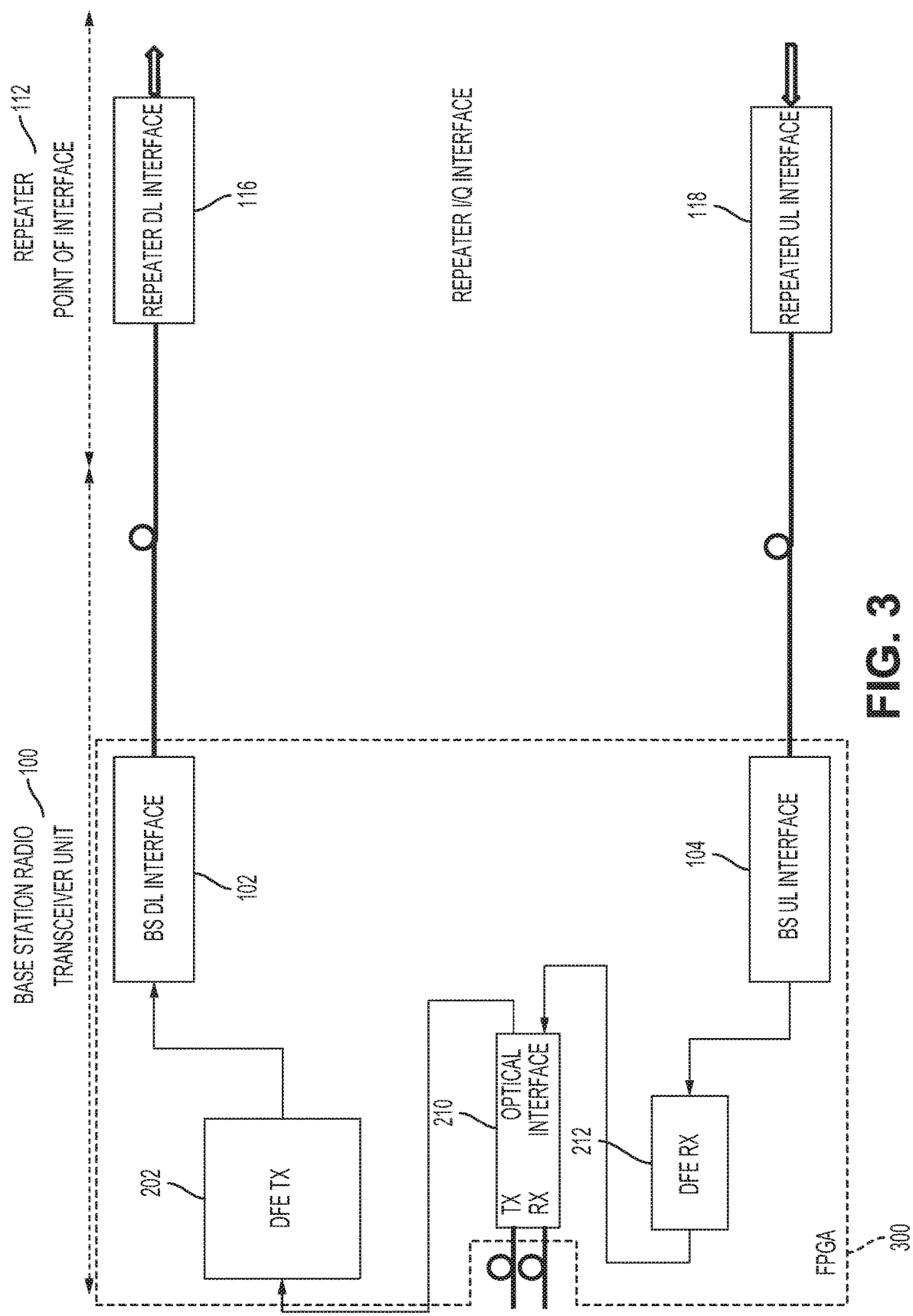
FIG. 3 is a block diagram that depicts an example of a multichannel I/Q interface between a base station radio transceiver unit and a point of interface of a repeater unit, where components of the base station radio transceiver unit can be included in a field-programmable gate array according to one aspect of the present disclosure.

FIGS. 2-3 depict examples of architectures of a digital multichannel I/Q interface between the base station radio transceiver unit 100 and the point of interface of the repeater 112. The digital multichannel I/Q interface can be used to transport digital I/Q signals carrying information from multiple carriers between the base station and repeater.

FIG. 2 shows a block diagram depicting one example of a multichannel I/Q interface between the base station radio transceiver unit 100 and the point of interface of the repeater 112. The base station radio transceiver unit 100 in FIG. 2 can include components that can be used to transport wideband signals via an RF interface. The architecture of the interface in FIG. 2, however, may not perform digital-to-analog conversion and power amplification for RF output. Instead of radiating RF signals from the base station with antennas, the architecture in FIG. 2 provides a wideband multichannel I/Q interface between the transceiver radio unit of the base station and the point of interface of the repeater.

The base station radio transceiver unit 100 can include a Digital Front End ("DFE") transmit block 202, a predistorter 204, a DAC interface 206, an ADC interface 214, and a DFE receive block 212, each of which can be implemented in an application-specific integrated circuit ("ASIC") 220 or other processing device. The DAC interface 206 and ADC interface 214 can include high speed digital interfaces implemented via a serial interface. An example of a serial interface is the JESD204B standard. The ASIC 220 can include a JESD204B interface 208 and a JESD204B interface 216 for receiving and transmitting JESD204B signals, respectively. The base station radio transceiver unit 100 can also include the base station downlink interface 102 and the base station uplink interface 104 for communicating with the point of interface of the repeater 112. While the JESD204B interfaces 208, 216 are shown for illustrative purposes, any serial or parallel interface can be used for communicating signals between the ASIC 220 and the point of interface of the repeater 112.

The base station radio transceiver unit 100 can communicate with a digital baseband unit of the base station using an optical interface 210. For example, the radio transceiver unit can transmit and receive signals with the digital baseband unit via the OBSAI or CPRI industry standards. Incoming downlink (transmit) signals that can carry multiple I/Q data streams can be provided to the DFE transmit block 202. The data streams can be provided from multiple carriers. The DFE transmit block 202 can include signal processing modules that process the multiple I/Q data streams to a format suitable for the multichannel I/Q interface. Examples of operations performed by the signal processing modules include one or more of channel filtering operations, up-sampling operations, multi-carrier synthesis operations, and crest factor reduction operations.

For example, multiple I/Q streams received from the digital baseband unit may be received by the DFE-TX block 202 at a lower sampling rate than required by the multi-channel I/Q interface (e.g., at 30.72 MSamples for 20 MHz carrier bandwidth). The DFE-TX block 202 can increase the sampling rate of the multiple I/Q streams (e.g., by a factor of 10 to 307.2 MSamples) through various implementations. The DFE-TX block 202 can, for example, pass the I/Q streams received from the digital baseband unit through multiple filter stages. A high order lowpass filter (sometimes called a channel filter) can increase the rate of the I/Q data streams at a 1:2 rate. The unsampled I/Q data streams can be further mixed by a complex modulator to the desired carrier frequency. In some aspects, crest factor reductions are applied to the high rate multicarrier signals—although other implementations exist. After processing the multiple I/Q data streams, the DFE-TX block 202 outputs raw wideband I/Q data streams.

The single raw wideband I/Q data streams outputted from the DFE transmit block 202 can be provided to a predistorter 204 before being output through a DAC interface 206. For example, the DAC interface 206 can include an interface that implements the JESD204B digital standard and is a high speed digital interface. The base station radio transceiver unit 100 can provide the I/Q data streams to the base station downlink interface 102 via the JESD204B interface 208.

The architecture of the digital multichannel interface between the base station radio transceiver unit 100 and the repeater 112 shown in FIG. 2 can interface with base station hardware customized for an RF interface. For example, the radio transceiver unit 100 in FIG. 2 can include an ASIC 220 or other processing device. The predistorter 204 in the ASIC 220, however, is included for processing signals for transmission via an RF interface. While interfacing the base station with a multichannel I/Q interface, the predistorter 204 in the ASIC 220 can be powered off since the digital signal may not be converted to analog and output via RF radiation. The downlink raw wideband I/Q stream from the DFE transmit block 202 can bypass the predistorter 204 and be outputted through the DAC interface 206, such as a JESD204B interface 208 to a base station downlink interface 102.

The base station downlink interface 102 can receive the digital information of raw wideband I/Q streams from the JESD204B interface 208, reformat the digital information, and serialize the information by combining the signal with control information. For example, the data stream can be converted using 64b/66b coding techniques and applied as a 10-GBit Ethernet stream. The base station downlink interface 102 can allow the base station radio transceiver unit 100 to create a digital data stream that can be provided to the point of interface of the repeater 112 without converting the digital data to an analog stream or outputting through an RF antenna.

The downlink signal can be received from the base station at the repeater downlink interface 116. The data can be received as serialized reformatted wideband I/Q data and control information. The repeater downlink interface 116 can process the incoming serialized stream to extract the reformatted wideband I/Q data and the control information for further processing in the DAS.

An uplink signal from the DAS can be provided through a repeater uplink interface 118 at the point of interface of the repeater 112. The repeater uplink interface 118 can reformat the digital information and serialize the information. Reformatting and serializing the digital information can convert the digital information to the proper format for transport to the base station. A base station uplink interface 104 can receive the uplink serialized data signal from, unpack the reformatted wideband I/Q data and associated control information, and provide the raw wideband I/Q data and control information to the DFE receive block 212 via the ADC interface 214 in the base station radio transceiver unit 100, such as a JESD204B interface 216.

The base station downlink interface 102 and base station uplink interface 104 can be implemented in a field programmable gate array ("FPGA") 230 or similar processing device. The FPGA 230 can be coupled to an ASIC 220 of the base station radio transceiver unit 100 including the DFE transmit block 202, predistorter 204, DAC interface 206, DFE receive block 212, and ADC Interface 214 via the JESD204B standard. The repeater downlink interface 116 and the repeater uplink interface 118 can be implemented in a similar FPGA in the repeater 112. The FPGA 230 can be or include one or more plug-in modules (e.g., the base station downlink interface and base station uplink interface) that can interface to the JESD204B interface of the radio transceiver unit ASIC.

In some aspects, a free running frame generator in the repeater uplink interface 118 can provide frame signals including framing information to each of the base station uplink interface 104, base station downlink interface 102, and repeater downlink interface 116 units. The framing information can include timing information for maintaining frame synchronization of uplink transmit frames and downlink transmit frames between the base station downlink interface 102, repeater downlink interface 116, base station uplink interface 104, and repeater uplink interface 118. The frame generator can maintain synchronization between uplink frames and downlink frames between the base station radio transceiver unit 100 and the repeater 112. The frame generator in the repeater can be free running, such that it can continually generate frame signals at a pre-determined clock rate.

In other aspects, the free running frame generator can be included in the base station. For example, a free running frame generator in the base station downlink interface 102 can provide framing information to the repeater uplink interface 118, repeater downlink interface 116, and base station uplink interface 104. A free running frame generator in the base station uplink interface 104 can provide framing information to the repeater uplink interface 118, repeater downlink interface 116, and base station downlink interface 102.

Although the architecture in FIG. 2 depicts the DFE transmit block 202, predistorter 204, and DAC interface 206 as part of an ASIC 220, other implementations are possible. In some aspects, additional efficiency can be achieved by implementing the DFE transmit block 202 of the base station radio transceiver unit 100 in an FPGA. For example, FIG. 3 is a block diagram depicting a multichannel I/Q interface between the base station radio transceiver unit 100 and the repeater 112, where components of the base station radio transceiver unit 100 can be included in an FPGA 300. For example, the DFE transmit block 202, DFE receive block 212, base station downlink interface 102, and base station uplink interface 104 shown in FIG. 3 can be included as modules in an FPGA 300 in the base station radio transceiver unit 100.

Implementing the transceiver radio unit in the FPGA 300 can allow for a fully integrated architecture. A fully integrated architecture can include implementing the DFE transmit block 202, base station downlink interface 102, and base station uplink interface 104 within the FPGA 300 of the base station radio transceiver unit 100. Downlink signals received from the base station digital baseband unit can be processed in the DFE transmit block 202. Raw wideband I/Q data streams can be provided to the base station downlink interface 102. The base station radio transceiver unit 100 can be communicatively coupled to the repeater 112 via an electrical or optical link via the base station downlink interface 102, repeater downlink interface 116, base station uplink interface 104, and repeater uplink interface 118. The optical interface 210, DFE transmit block 202, DFE receive block 212, base station downlink interface 102, base station uplink interface 104, repeater downlink interface 116, and repeater uplink interface 118 can operate similar to the components shown in FIG. 2.

Figure 4:
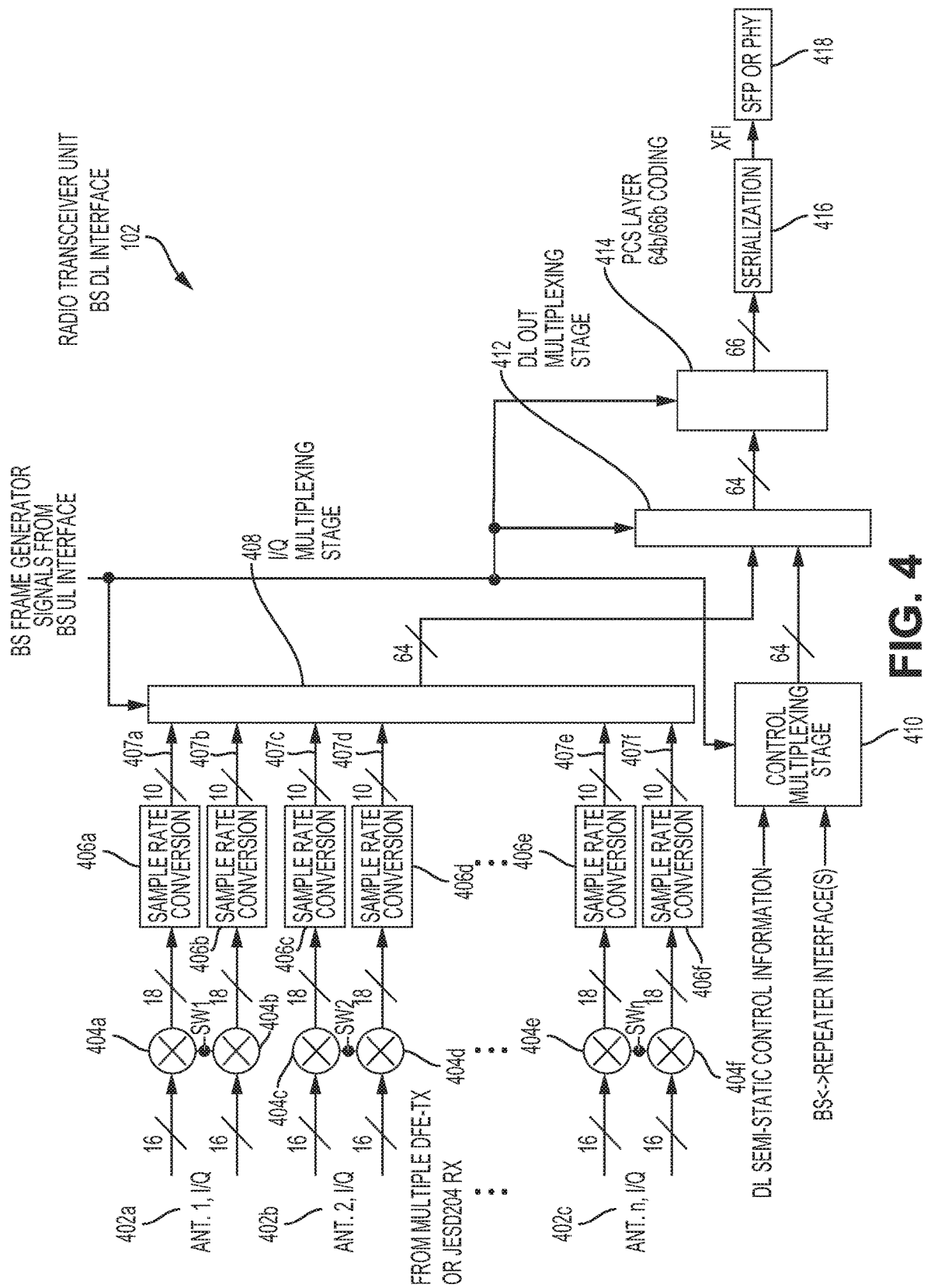
FIG. 4 is a block diagram that depicts an example of a base station downlink interface from FIGS. 2 and 3 according to one aspect of the present disclosure.

FIGS. 4-7 are block diagrams depicting examples of architectures for the base station downlink interface 102, repeater downlink interface 116, repeater uplink interface 118, and base station uplink interface 104, respectively. Turning to FIG. 4, an example of a base station downlink interface 102 is depicted. Raw wideband I/Q data streams 402a-c can be provided from the DFE transmit block 202 shown in FIG. 3 or the JESD204 interface 208 of FIG. 2. Each of the raw wideband I/Q data streams 402a-c can include a 16-bit in-phase data stream and a 16-bit quadrature phase data stream. Each of the I/Q data streams 402a-c can carry information from one or multiple carrier signals.

Multipliers 404a-f and sample rate converters 406a-f can reformat the raw wideband I/Q data streams 402a-c. For example, the multipliers 404a-f and sample rate converters 406a-f can process the 16-bit I/Q data streams 402a-c to 10-bit streams. The multipliers 404a-f and sample rate converters 406a-f can thereby reformat the raw wideband I/Q data streams 402a-c by scaling and sampling the bit streams into 10-bit reformatted wideband I/Q streams 407a-f. While sample rate converters 406a-f are shown for illustrative purposes, multiple implementations are possible with varying complexities of processing. The reformatted wideband I/Q data streams 407a-f can be provided to an I/Q multiplexer 408. The I/Q multiplexer 408 can multiplex the reformatted wideband I/Q data streams 407a-f to a stream of 64-bit words. Base station framing signals including frame timing information can be received from the base station uplink interface 104. The frame timing information can be provided to the I/Q multiplexer 408 to control the multiplexing of the compressed I/Q data streams. As discussed further below, the base station framing signals can be generated by a frame clock generator in the base station uplink interface 104 and the frame timing information can be originally provided from the repeater 112.

The base station downlink interface 102 can also include a control multiplexer 410. The control multiplexer 410 can multiplex downlink semi-static control information and additional control information for the base-station-to-repeater interface (e.g., control information specified in the in the Antenna Interface Standard Group ("AISG") 2.0 protocol). Base station framing signals from the base station uplink interface 104 can also be provided to the control multiplexer 410 to control the multiplexing of the of the control information. Semi-static control information can be repeated every frame filling the available unused link bandwidth. The semi-static control information can contain information elements specifying DAS control information. Example of the information elements may include one or more of RF uplink and downlink power, lower and upper band edge, carrier frequency, uplink gain, repeater roundtrip delay, group delay, alarm bits, status bits, base station class, time division duplexing ("TDD") timing information, uplink noise figures, and root mean square targets in decibels relative to full scale. The semi-static control information can be protected. An example process for protecting the semi-static control information involves applying cyclic redundancy check information to the semi-static control information.

The semi-static control information can contain multiple information element sets. For example, each antenna port of a base station can be associated with a corresponding information element set. The base-station-to-repeater communication links may be used to allow communication between the baseband unit and the repeater (e.g. according the AISG 2.0 standard). For example, information elements such as position information and current antenna downtilt setting can be provided to the base station baseband unit. The baseband unit may send semi-static control information such as an updated antenna downtilt value to control the spatial coverage area of the DAS. In some aspects, the repeater 112 can report alarms from the DAS using an AISG interface.

The control multiplexer 410 can output the multiplexed control stream as 64-bit words. In some aspects, semi-static control information provided by a multi-channel I/Q interface can allow emulation of macro base station external apparatus (e.g, filters, amplifiers, remote electronic tilt "RET" units). For example, one or more of antenna tilt information, base station power, and information regarding coverage within a coverage zone can be signaled emulating macro base station external apparatus.

The 64-bit I/Q data and 64-bit control data can be provided to a second stage multiplexer 412 along with the base station framing signals provided by a frame clock generator in the base station uplink interface 104. The second stage multiplexer 412 can output a 64-bit frame signal that is provided to a 64b/66c coding encoder, such as a Physical Coding Sublayer ("PCS") layer 414. The PCS layer 414 can receive the multiplexed I/Q data and control information and output a 66-bit stream that is serialized via a serialization unit 416 for output through an Small Form-Factor Pluggable ("SFP") 418 or other physical interface. The SFP interface 418 can provide the serialized downlink transmit frames including the I/Q information and control information to the repeater downlink interface 116.

Figure 5:
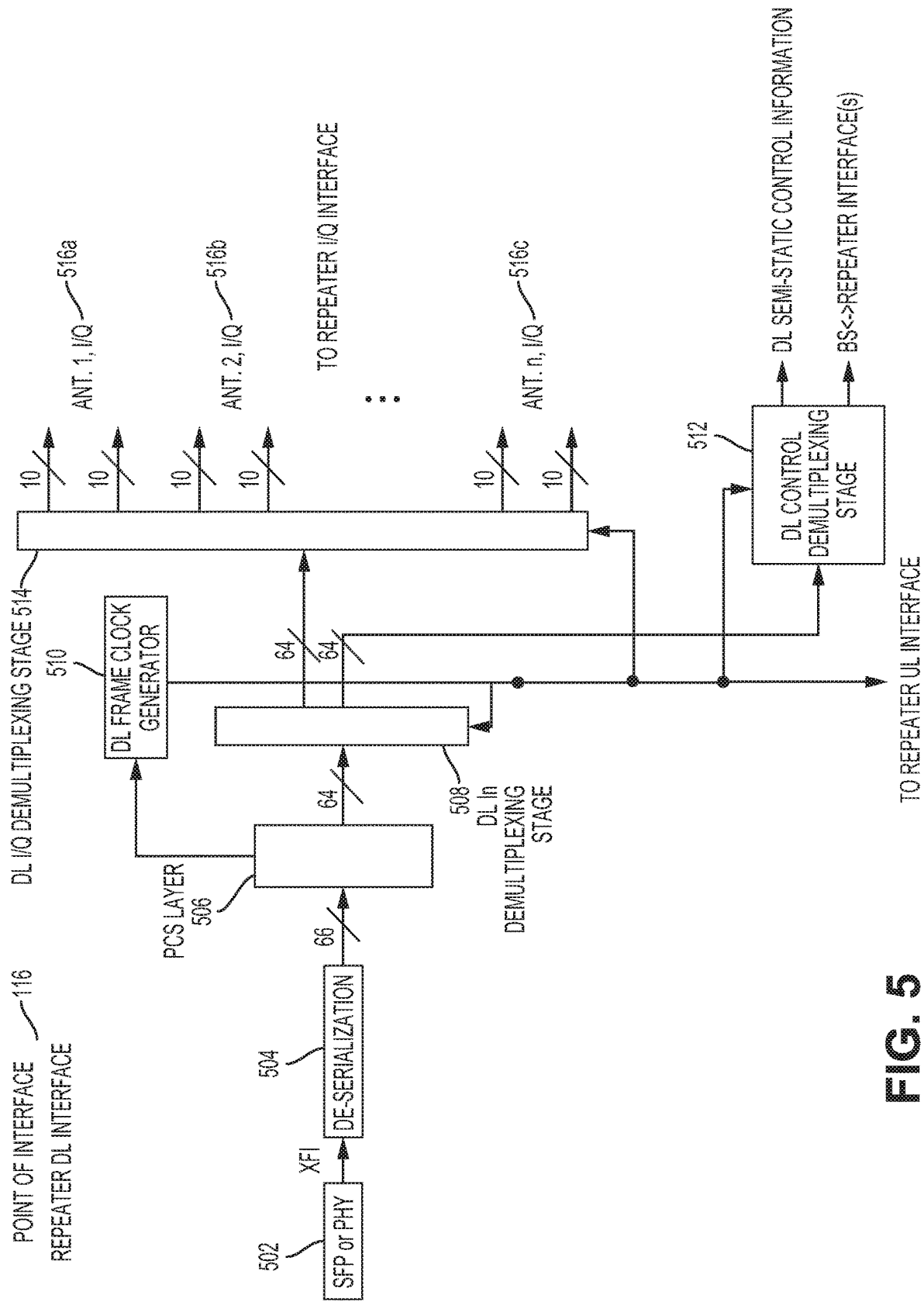
FIG. 5 is a block diagram that depicts an example of a repeater downlink interface from FIGS. 2 and 3 according to one aspect of the present disclosure.

FIG. 5 is a block diagram depicting an example of the repeater downlink interface 116 shown in FIG. 1. The repeater downlink interface 116 can receive the serialized 66-bit stream containing I/Q data and control information from the base station downlink interface 102 on the base station radio transceiver unit 100. The modules of the repeater downlink interface 116 can perform the inverse operations of the modules of the base station downlink interface 116. For example, the repeater downlink interface 116 can include an SFP or other physical interface 502 for receiving the serialized 66-bit stream. The received 66-bit stream can be de-serialized into data frames via a de-serialization unit 504 and provided to a PCS layer 506 that applies 64b/66b decoding. Applying the 64b/66b decoding can provide 64-bit data that is sent to a de-multiplexer 508. The de-multiplexer 508 can extract the 64-bit I/Q data and 64-bit control information. The 64-bit I/Q data can be provided to an I/Q de-multiplexer 514. The I/Q de-multiplexer 514 can de-multiplex the serialized I/Q data into separate reformatted wideband I/Q streams 516a-c for each antenna port of the repeater 112. The I/Q data can be then sent to the repeater I/Q interface for further processing and distribution to the radio unit 114.

The 64-bit control signals can be provided to a downlink control de-multiplexer 512. The downlink control de-multiplexer 512 can extract the downlink semi-static control information and base-station-to-repeater interface control information. The downlink semi-static control information and base-station-to-repeater interface control information can also be provided to the radio unit 114.

The PCS layer 506 can also extract frame timing information from the 66-bit frame signals. The frame timing information can include the timing information defining the start of the transmit frames, end of the transmit frames, and duration of the transmit frames received from the base station downlink interface 102. The frame timing information can be provided to a downlink frame clock generator 510. The downlink frame clock generator 510 can synchronize to the received frame timing information. The frame timing information extracted from the downlink transmit frames from the base station radio transceiver unit 100 can thereby synchronize the downlink frame clock generator 510 at the repeater downlink interface 116. The downlink frame clock generator 510 can generate corresponding downlink framing clock signals using the extracted frame timing information and provide the downlink framing clock signals to the I/Q de-multiplexer 514. The downlink framing clock signals can also be provided to the repeater uplink interface 108. Providing the downlink frame clock signals to the repeater uplink interface 108 can allow the downlink frames and uplink frames to maintain synchronization.

Figure 6:
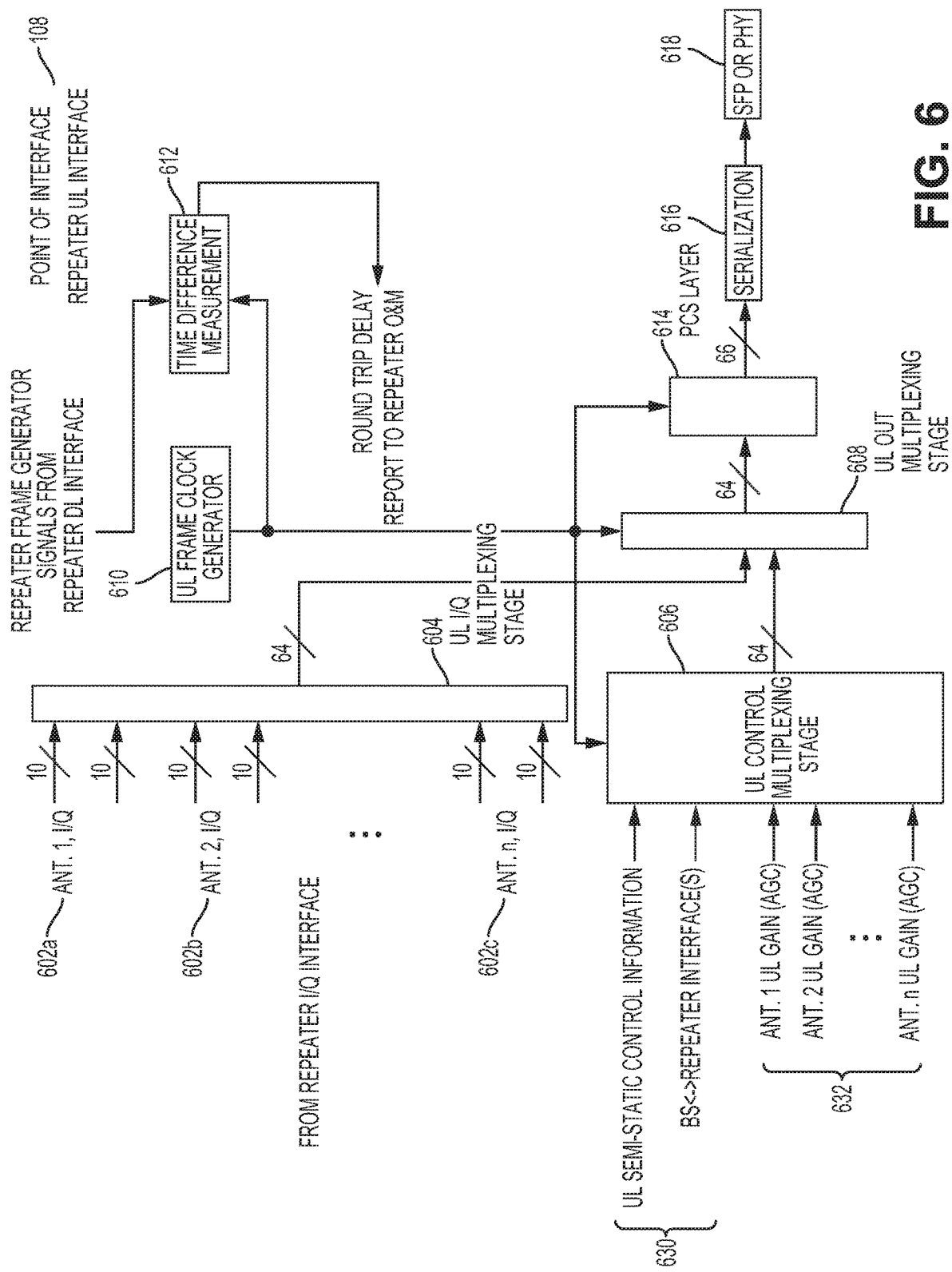
FIG. 6 is a block diagram that depicts an example of a repeater uplink interface from FIGS. 2 and 3 according to one aspect of the present disclosure.
Figure 7:
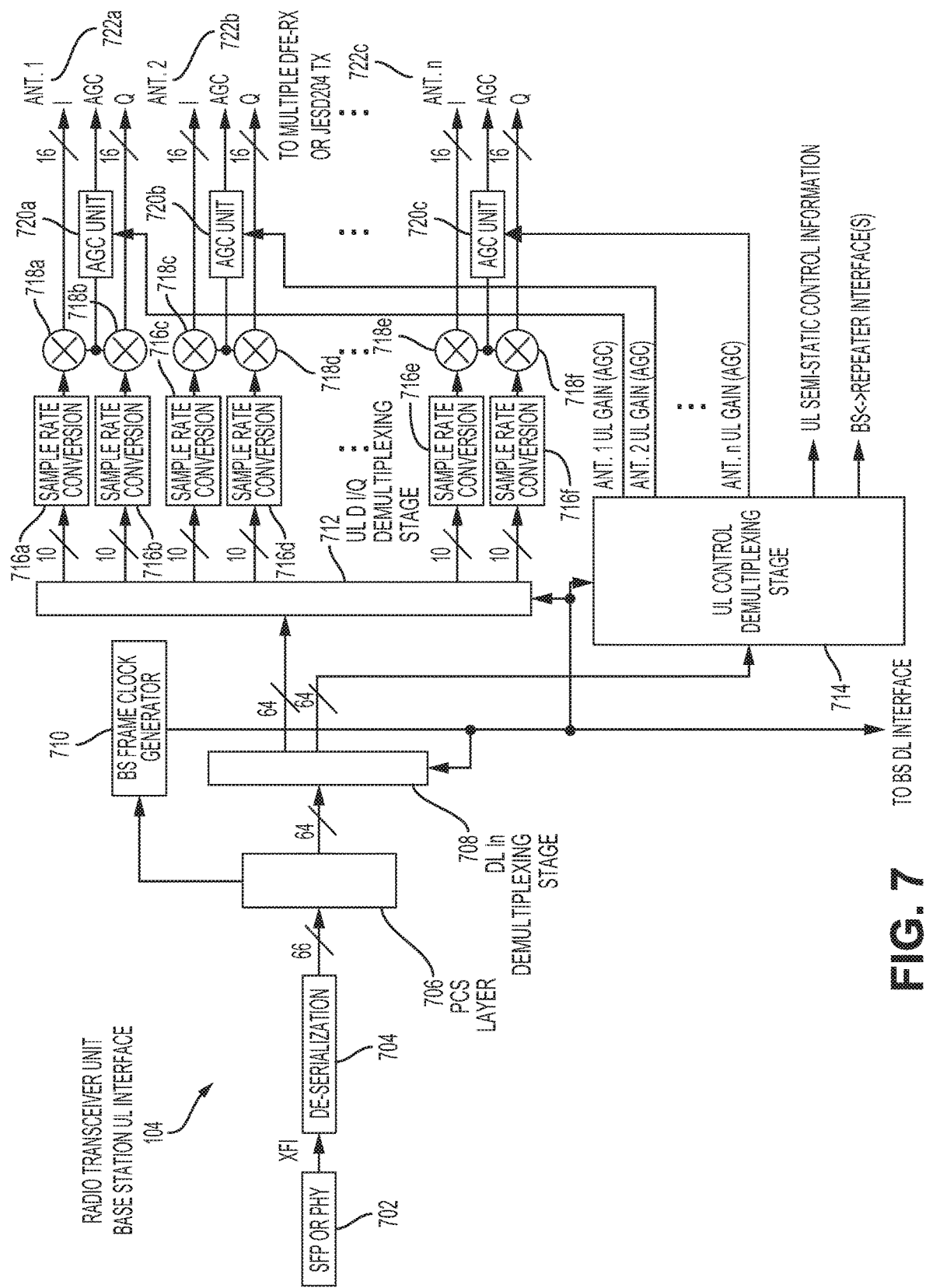
FIG. 7 is a block diagram that depicts an example of a base station uplink interface from FIGS. 2 and 3 according to one aspect of the present disclosure.

FIGS. 6-7 depict block diagrams of the repeater uplink interface 118 and base station uplink interface 104 that can be used for providing uplink reformatted wideband I/Q samples and control information from the radio unit 114 to the base station.

FIG. 6 is a block diagram depicting an example of the repeater uplink interface 118. Modules of the repeater uplink interface 118 perform similar functions as the modules in the base station downlink interface 102, described above, for uplink signals from the radio unit 114. For example, the repeater uplink interface 108 can receive uplink reformatted wideband I/Q data streams 602*a-c* and control signals 630 from the repeater I/Q interface (e.g., the antenna interface to the radio unit 114).

The reformatted wideband uplink I/Q data streams 602*a-c* can be provided to an uplink I/Q multiplexer 604. The uplink I/Q multiplexer 604 can multiplex the reformatted wideband uplink I/Q data streams 602*a-c* and provide the multiplexed I/Q data streams to a second stage multiplexer 608. The uplink controls signals 630, which can include uplink semi-static control information and additional uplink control information for the base-station-to-repeater interface, can be provided to an uplink control multiplexer 606. The uplink semi-static control information and additional control information for the base-station-to-repeater interface is similar to the downlink semi-static control information and control information for base-station-to-repeater interface described above with respect to FIG. 4. Additionally, the repeater uplink interface 108 can receive uplink antenna gain control signals 632 from the repeater I/Q interface. The uplink gain control signals 632 can also be provided to the uplink control multiplexer 606. The uplink gain control signals 632 can adapt the gain value (e.g., signal strength) of the received uplink signals. The uplink control multiplexer 606 can multiplex uplink control signals 630 and antenna uplink gain control signals 632 and output the multiplexed signals as a 64-bit control stream to the second stage multiplexer 608.

The second stage multiplexer 608 can multiplex the 64-bit I/Q data words and 64-bit control information to a stream of uplink transmit frames as 64-bit words. An uplink frame clock generator 610 can generate the uplink framing clock signals that include the frame timing information to generate the uplink transmit frames. For example, the frame timing information can include timing information specifying the start of the transmit frame, the end of the transmit frame, and the duration of the transmit frame. The uplink framing clock signals can be provided as the control input to the second stage multiplexer 608. The uplink 64-bit data words can be provided to a PCS layer 614, which performs 64b/66b coding similar to the PCS layer 414 discussed above with respect to FIG. 4. The 66-bit output stream of the PCS layer 614 can be serialized by a serialization unit 616 and output to the base station uplink interface 104 via an SFP 618 or other physical interface.

FIG. 7 is a block diagram depicting an example of the base station uplink interface 104 shown in FIG. 1. The base station uplink interface 104 can receive the uplink serialized data stream provided from the repeater uplink interface 108. The uplink serialized data stream can be de-serialized into 66-bit words via de-serialization unit 704 and provided to a PCS layer 706 for 64b/66b decoding. The PCS layer 706 can extract the framing information from the received signal and provide the framing information to a base station frame clock generator. The framing information can include the timing information defining the start of the uplink frames, end of the uplink frames, and duration of the uplink frames received from the repeater uplink interface 108. Framing information can be provided to the base station frame clock generator 710. Since the uplink frame clock generator 610 in the repeater uplink interface 108 generated the framing clock signals including the frame timing information, the base station frame clock generator 710 may be synchronized by the frame timing information from the repeater 112. Using the frame timing information from the repeater 112 to synchronize the base station frame clock generator 710 can align the uplink and downlink transmit frames. The base station frame clock generator 710 can use the received repeater frame timing information to generate base station framing clock signals and provide the base station framing clock signals to an uplink control de-multiplexer 714 and an uplink I/Q de-multiplexer 712.

The PCS layer 706 can also decode I/Q data streams and control information from the 66-bit data stream received from the de-serialization unit 704. The I/Q and control data can be provided to the uplink control de-multiplexer 714. Using the base station clock signals from the base station frame clock generator 710, the uplink control de-multiplexer 714 can de-multiplex the uplink semi-static control information and additional control information for the base-station-to-repeater interface. The uplink control de-multiplexer 714 can also de-multiplex uplink antenna gain signals, which can be provided to antenna-gain-control (AGC) units 720*a-c* to adjust the uplink gains of each raw wideband I/Q data stream 722*a-c*.

Similarly, the decoded I/Q data streams can be provided to the uplink I/Q de-multiplexer 712. The uplink I/Q de-multiplexer 712 can de-multiplex the individual reformatted wideband I/Q streams (each a 10-bit I/Q stream) and provide the streams to sample rate converters 716*a-f*. Sample rate converters 716*a-f* and multipliers 718*a-f* can process the data streams into raw wideband I/Q streams. The AGC units 720*a-c* can apply the uplink gain adjustment extracted from the uplink control de-multiplexer 714 to the multipliers 718*a-f* for adjusting the uplink gain for each uplink raw wideband I/Q stream. The AGC value can be reported relative to the scaled 16-bit I/Q to support the base station for calculating the current input receive strength. The base station uplink interface 104 can then provide the raw wideband uplink I/Q data streams and AGC information from AGC units 720a-c to the base station baseband unit via the JESD204B interface shown in FIG. 2 or the DFE receive block 212 shown in FIG. 3.

As discussed above, the digital multichannel I/Q interface between the repeater 112 and the base station radio transceiver unit 100 can maintain frame synchronization between the uplink frames and downlink frames in the system by providing frame timing information among the base station downlink interface 102, repeater downlink interface 116, repeater uplink interface 118, and base station uplink interface 104.

For example, returning to FIG. 6, the repeater uplink interface module can include an uplink frame clock generator 610. The uplink frame clock generator 610 can provide framing via a free running counter. The uplink frame clock generator 610 can feed the uplink framing clock signal into the multiplexed I/Q and control data stream via second stage multiplexer 608. The base station uplink interface 104 can receive the multiplexed data stream including the I/Q data, control signaling, and frame timing information. The base station uplink interface 104 can extract the repeater frame timing information and use the repeater frame timing information to properly de-multiplex the data while maintaining frame timing with the repeater 112. The base station uplink interface 104 can also generate a base station framing clock signal using the repeater frame timing information and provide the base station framing clock signal to the base station downlink interface 102. The base station downlink interface 102 can apply the base station framing clock signal to generate downlink I/Q and control frames. Thus, the original uplink framing clock signal generated by the uplink frame clock generator 610 at the repeater uplink interface 108 can be used to control both uplink and downlink frame synchronization throughout the multichannel interface.

Further, the arrangement of the uplink frame clock generator 610 can allow the repeater 112 to take round trip measurements of the signal, so that the repeater 112 can measure the delay between the base station and repeater link. For example, the repeater downlink interface 116 can receive serialized reformatted wideband I/Q streams from the base station downlink interface 102. The repeater downlink interface 116 can extract the frame signal from the multiplexed stream and provide the frame timing information to a downlink frame clock generator 510. The extracted frame timing information can control the downlink frame clock generator 510 (shown in FIG. 5). The downlink frame clock generator 510 can provide a downlink framing signal, including frame timing information, back to the repeater uplink interface 108 in FIG. 6. The downlink framing signal can be provided to a time difference measurement unit 612. The time difference measurement unit 612 can compare the received downlink framing clock signal from the repeater downlink interface 116 with the uplink framing clock signals output from the uplink frame clock generator 610. This time difference can correspond to the round trip delay on the full link. This comparison can yield the roundtrip delay of the base station—repeater link. This delay value can be combined with the repeater delay to enforce a delay compensation. An operations & management unit at the baseband unit can instruct the repeater or the radio transceiver unit 100 to compensate for the roundtrip delay. The roundtrip delay compensation can be reported from the repeater uplink interface 108 to the baseband unit of the base station via the radio transceiver unit 100 of the base station. In other aspects, the radio transceiver unit 100 of the base station can process the roundtrip delay and report the delay compensation to the baseband unit.

To compensate for the roundtrip delay, for example, the base station downlink interface 102 can advance the transmit timing of the reformatted wideband downlink multichannel I/Q samples and control signals 140 or the base station uplink interface 104 can delay the receive timing of the reformatted wideband uplink multichannel I/Q samples and control signals 142. In another aspect, the radio transceiver unit 100 or the repeater 112 can introduce a delay period corresponding to the reported delay information to the control information in CPRI protocol messaging between the baseband unit and radio transceiver unit 100.

Figure 14:
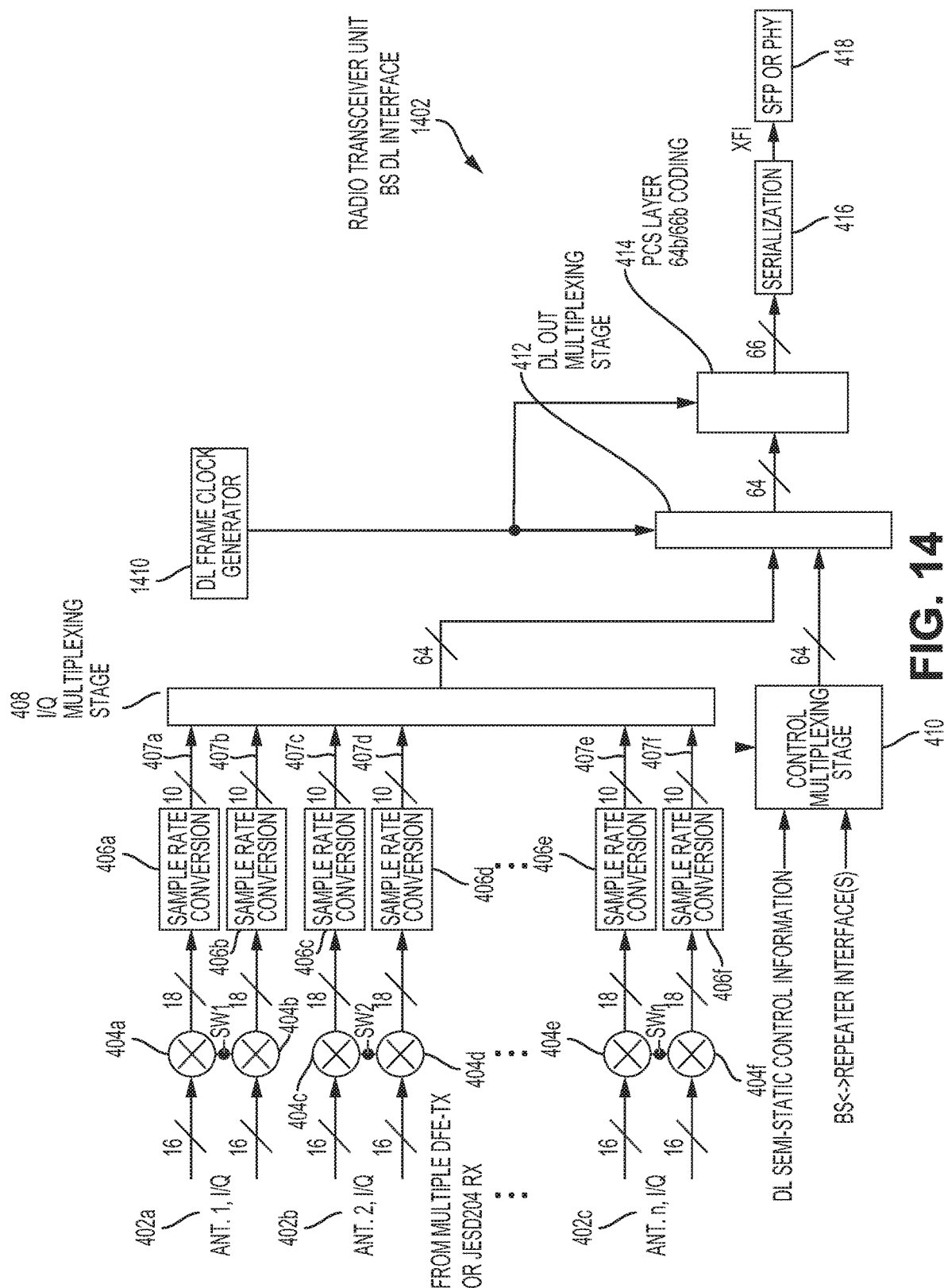
FIG. 14 is a block diagram that depicts an example of a base station downlink interface that includes a free running clock generator according to one aspect of the present disclosure.

The discussion above with respect to FIGS. 4-7 describes the repeater uplink interface 108 as generating the initial frame timing information. However, in some aspects, the base station can generate the initial frame timing information. For example, the base station can include a free running frame generator in one or more of the base station downlink interface 102 or the base station uplink interface 104. FIG. 14 depicts another aspect for a base station downlink interface 1402 that can be configured to generate the initial frame timing information. Base station downlink interface 1402 can include components similar to the components in the base station downlink interface 102 described with respect to FIG. 4. For example, base station downlink interface 1402 can include multipliers 404a-f, sample rate converters 406a-f, I/Q multiplexer 408, control multiplexer 410, second stage multiplexer 412, PCS layer 414, serialization unit 416, and SFP or PHY output 418.

Base station downlink interface 1402 can also include downlink frame clock generator 1410, which can function similar to the frame clock generator 610 in the repeater uplink interface 108. Downlink frame clock generator 1410 can generate base station framing clock signals at a predetermined clock rate. The base station framing clock signals can carry frame timing information. The frame timing information generated by the downlink frame clock generator 1410 can be used to generate the downlink transmit frames carrying wideband formatted downlink I/Q streams and control information. The downlink transmit frames can be provided to the repeater downlink interface 116. In this aspect, the repeater downlink interface 116 can extract the frame timing information from the downlink transmit frames and provide the frame timing information to the repeater uplink interface 118. The repeater uplink interface 118 can use the frame timing information to generate uplink transmit frames that are synchronized with the downlink transmit frames. Further, the base station can measure the round trip delay of the link by comparing the frames of the downlink signals transmitted by the base station with the frames of the uplink signals received by the base station.

Figure 8:
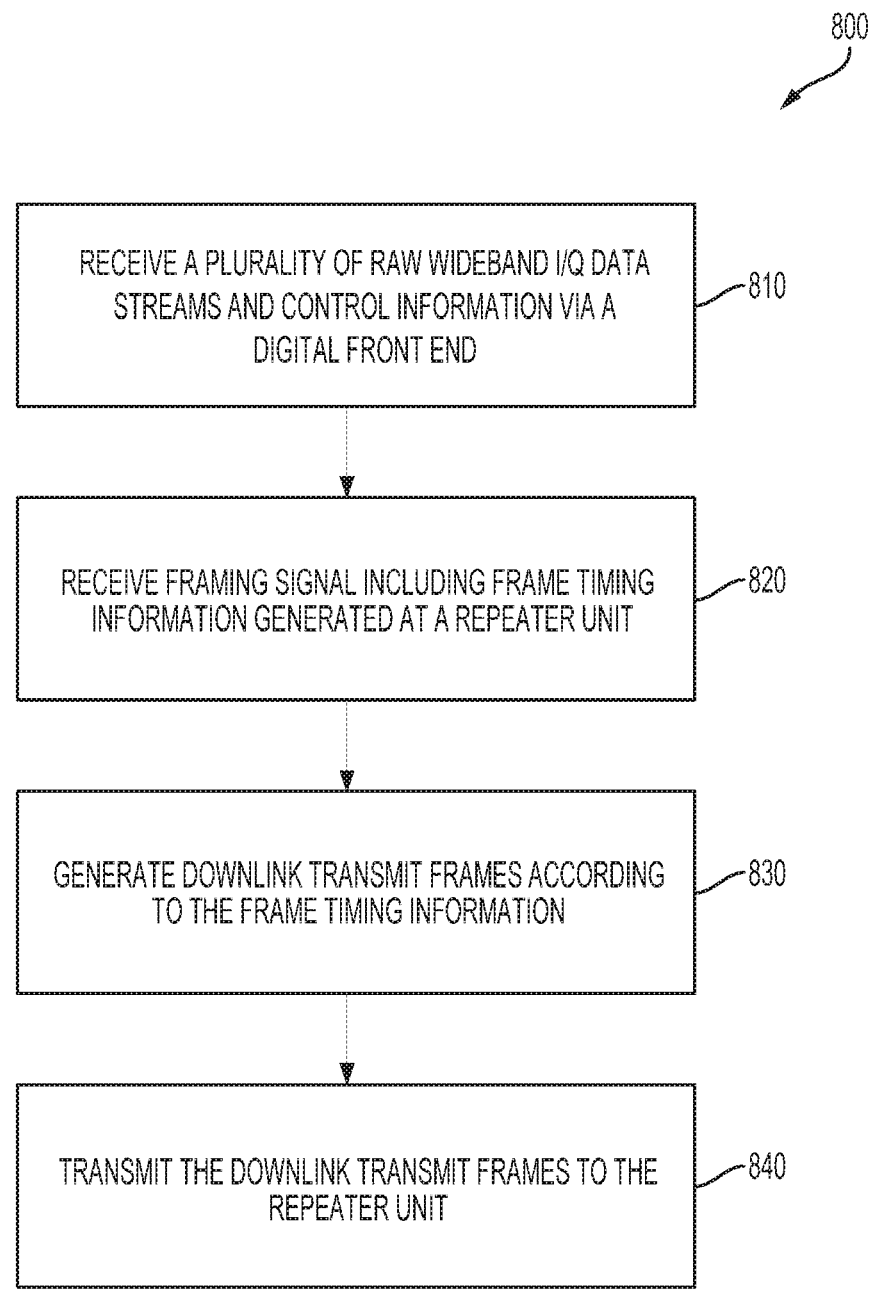
FIG. 8 is a flowchart that depicts an example of a process for communicating digital samples of I/Q data from a base station to a repeater unit using a digital multichannel I/Q interface according to one aspect of the present disclosure.

FIG. 8 is a flowchart 800 depicting an example of a process for communicating digital samples of I/Q data from a base station to a repeater using a digital multichannel I/Q interface.

In block 810, the base station radio transceiver unit 100 can receive multiple raw wideband I/Q data streams and control information via the DFE-TX block 120 of the base station radio transceiver unit 100. As explained above with respect to FIG. 1, the digital baseband unit of the base station can provide downlink wideband communication information and control information as multiple I/Q streams to the DFE transmit block 120. The DFE transmit block 120 (also shown as the DFE transmit block 202 in FIGS. 2 and 3) can transmit multiple 16-bit I/Q data streams 402a-c (shown in FIG. 4) to the base station downlink interface 102. The base station downlink interface 102 can receive the 16-bit I/Q data streams 402a-c directly from the DFE transmit block 202 (as shown in FIG. 3) or via the JESD204B interface 208 (as shown in FIG. 2). Each 16-bit I/Q data stream 402 can correspond to a raw wideband I/Q data stream. Each raw wideband I/Q data stream can be associated to a respective antenna port. In addition to the I/Q data stream, the base station downlink interface 102 can also receive downlink semi-static control information and additional control information for the base-station-to-repeater interface from the DFE transmit block 202 or JESD204B interface 208.

The base station radio transceiver unit 100 can also receive a framing signal including frame timing information generated at a repeater 112, as shown in block 820. For example, the repeater uplink interface 108 (shown in FIG. 6) can include an uplink frame clock generator 610 that operates as a free running frame generator. The uplink frame clock generator 610 can provide uplink framing clock signals that define the frame timing information indicating the length of a frame, duration of each frame, as well as other timing characteristics. For example, framing clock signals can include 66b code words that may be defined as special characters. A 66b special character can be transmitted as the first 64b/66b word of a frame and thereby function as a delimiter between consecutive frames. In other aspects, framing clock signals can include information elements at the start of the frame for indicating the frame type or the detailed structure of the frame (e.g., the number of control bytes in the frame, the I/Q format in the frame, etc.). The uplink framing clock signals can be used to generate uplink transmit frames by controlling the second stage multiplexer 608, which multiplexes uplink I/Q information and uplink control information into uplink transmit frames. After serialization and coding, the uplink transmit frames can be provided to the base station uplink interface 104 (shown in FIG. 7). The base station uplink interface can de-serialize the received uplink stream and apply PCS decoding. The PCS layer 706 can extract the frame timing information, which can be fed to the base station frame clock generator 710. The base station frame clock generator 710 can generate base station framing clock signals that are fed to the base station downlink interface 102. Thus, the base station framing clock signals provided from the base station uplink interface 104 to the base station downlink interface 102 include frame timing information originally generated at the repeater uplink interface 108.

In block 830, the base station radio transceiver unit 100 can generate downlink transmit frames according to the frame timing information from the repeater 112. For example, the frame timing information can be provided to a second stage multiplexer 412, which can generate downlink transmit frames according to the timing information specified in the framing signals. In some aspects, the framing signals can be the control input to the second stage multiplexer 412. The second stage multiplexer 412 can multiplex the 64-bit I/Q stream (from I/Q multiplexer 408) and 64-bit control data (from the control multiplexer 410) to generate the downlink transmit frames. By generating transmit frames according to the frame timing information specified in the framing signals, the second stage multiplexer 412 can synchronize downlink transmit frames with uplink transmit frames from the repeater 112.

In block 840, the base station radio transceiver unit 100 can transmit the downlink transmit frames, which include the I/Q data streams and control information, to the repeater 112. For example, the base station downlink interface 102 can include a PCS layer 414 for 64b/66b coding of the downlink transmit frames. The downlink transmit frames can then be serialized via a serialization unit 416 and transmitted to the repeater downlink interface 116 via an SFP or other physical interface 418.

While FIG. 8 depicts the flowchart 800 for communicating digital samples of downlink I/Q data from a base station to a repeater, a similar process can be performed for communicating digital samples of uplink I/Q data from a repeater to a base station via a digital multichannel I/Q interface. For example, a repeater uplink interface 118 can receive uplink I/Q reformatted wideband data streams 602a-c and control signals 630 as shown in FIG. 6. The repeater uplink interface 118 can include a frame clock generator 610 that can generate the uplink framing clock signals that contain frame timing information used by both the repeater uplink interface 118 to generate uplink transmit frames and the base station downlink interface 102 to generate downlink transmit frames as explained above.

The repeater uplink interface 118 can multiplex the uplink I/Q reformatted wideband data streams 602a-c and control signals 630 and serialize the streams to generate the uplink transmit frames according to the frame timing information as explained above with respect to FIG. 6. The uplink transmit frames generated at the repeater uplink interface 118 may be provided to the base station uplink interface 104. The base station uplink interface 104 can process the received uplink transmit frames to generate the raw wideband uplink I/Q streams and control streams, as explained above with respect to FIG. 7. The raw wideband uplink I/Q streams and control streams can be provided to the base station baseband unit via the DFE-RX block 122.

Figure 9:
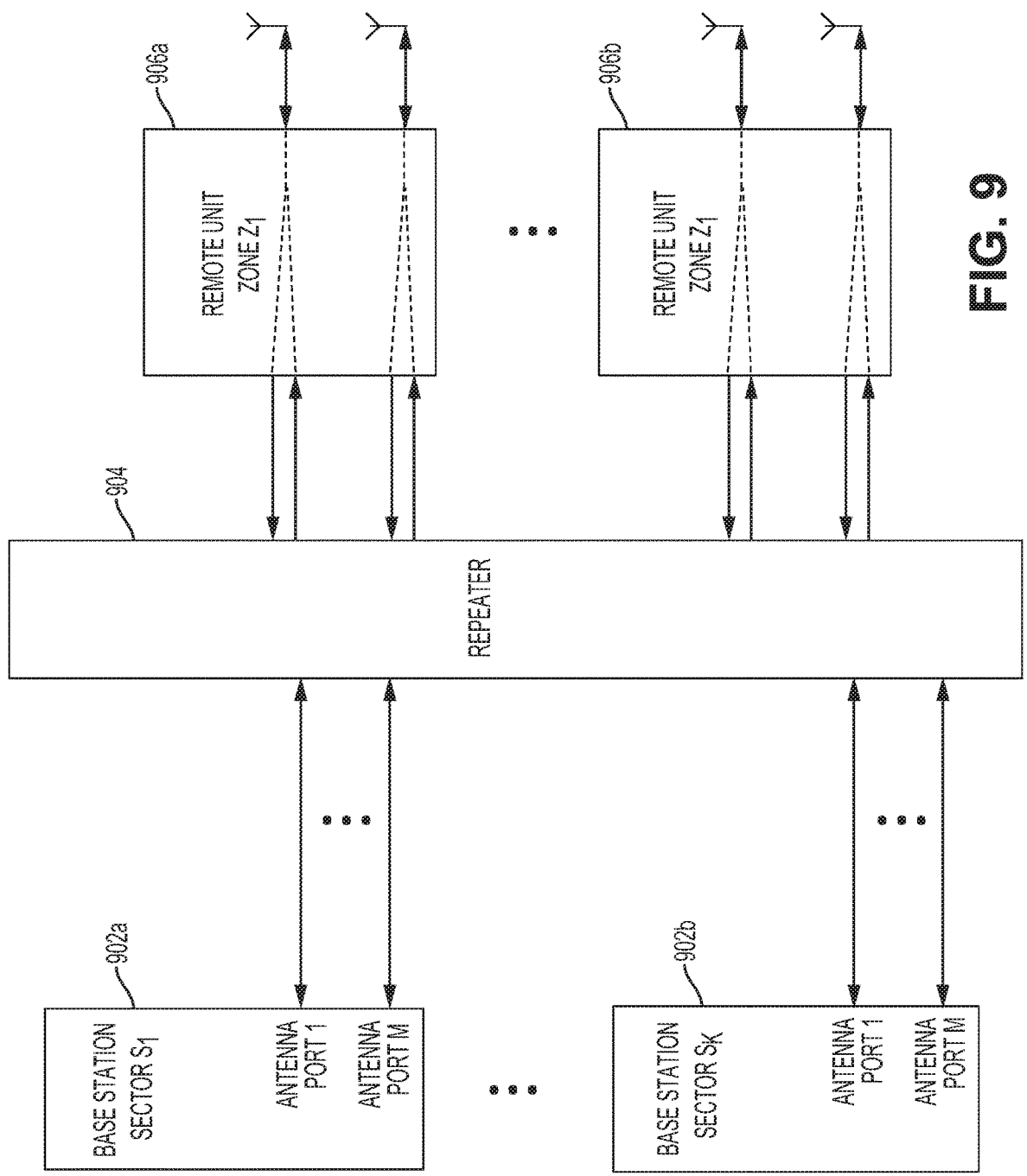
FIG. 9 is a block diagram that depicts an example of a multiband, multiport base station communicatively coupled with a repeater via multiple multichannel I/Q interfaces according to one aspect of the present disclosure.
Figure 10:
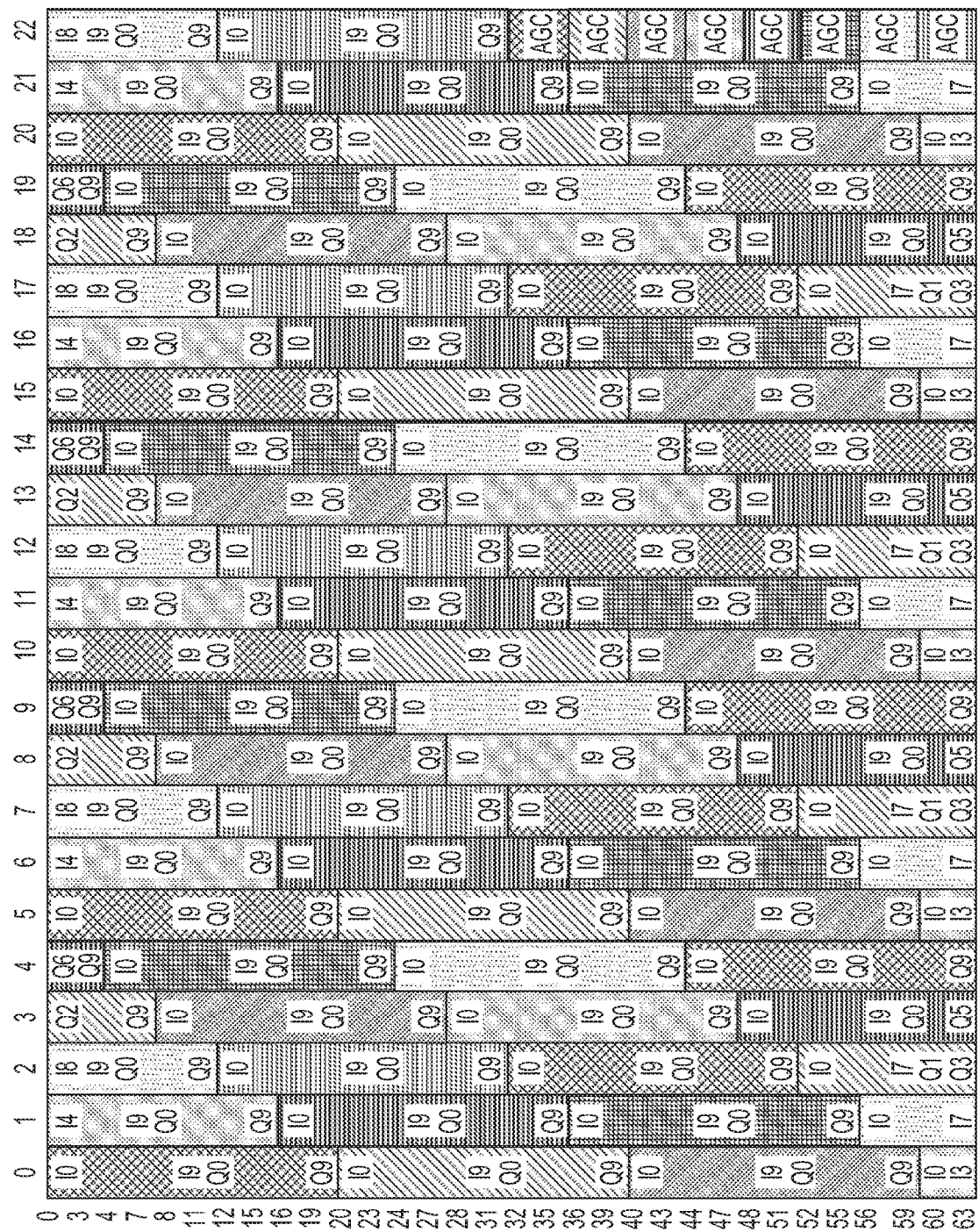
FIG. 10 depicts examples of I/Q clusters for a configuration involving eight antenna ports used for communicating I/Q samples using a digital multichannel interface according to one aspect of the present disclosure.
Figure 11:
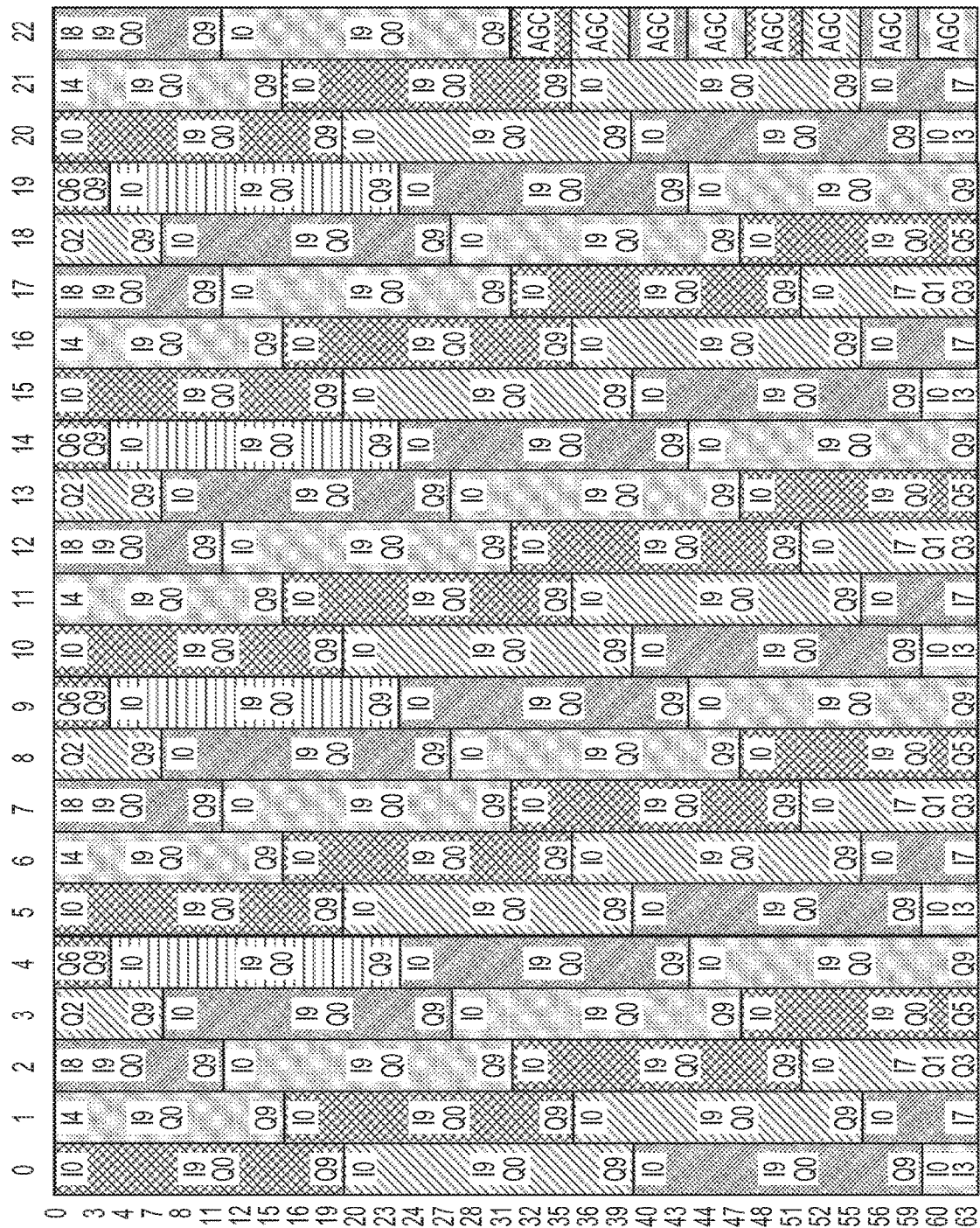
FIG. 11 depicts examples of I/Q clusters for a configuration involving four antenna ports used for communicating I/Q samples using a digital multichannel interface according to one aspect of the present disclosure.

The examples discussed above with respect to FIGS. 1-8 involve a multichannel I/Q interface used to couple a base station with a repeater. FIGS. 9-11 show examples of multichannel I/Q interfaces that can also be used to couple specific configurations of a base station with a radio distribution system. For example, FIG. 9 is a block diagram depicting an example of a multiband, multiport base station coupled with a repeater via multiple multichannel I/Q interfaces.

FIG. 9 includes a multiband, multiport base station that can include multiple sectors of antenna ports 902a-b. Each antenna port sector 902 can be used by the base station to transmit at a different frequency and a different sector of the cell. Each antenna port sector 902 can include a respective base station downlink interface and a base station uplink interface, which can function similarly to the base station uplink interface 104 and base station downlink interface 102 discussed above with respect to FIGS. 4, and 7. Each antenna port sector 902 of the base station can be coupled to a repeater 904 via respective multichannel I/Q interfaces. The repeater 904 can receive the streams of I/Q samples from the base station antenna port sectors 902a-b. The repeater 904 can include multiple repeater downlink interfaces (e.g., similar to repeater downlink interface 116) and repeater uplink interfaces (e.g., similar to repeater uplink interface 118) for the respective antenna port sectors 902a-b of the base station. The repeater 904 can process the incoming I/Q samples from the base station and provide them to one or more multiband, multiport remote units 906a-b via an RF or a digital I/Q communication link.

Figure 12:
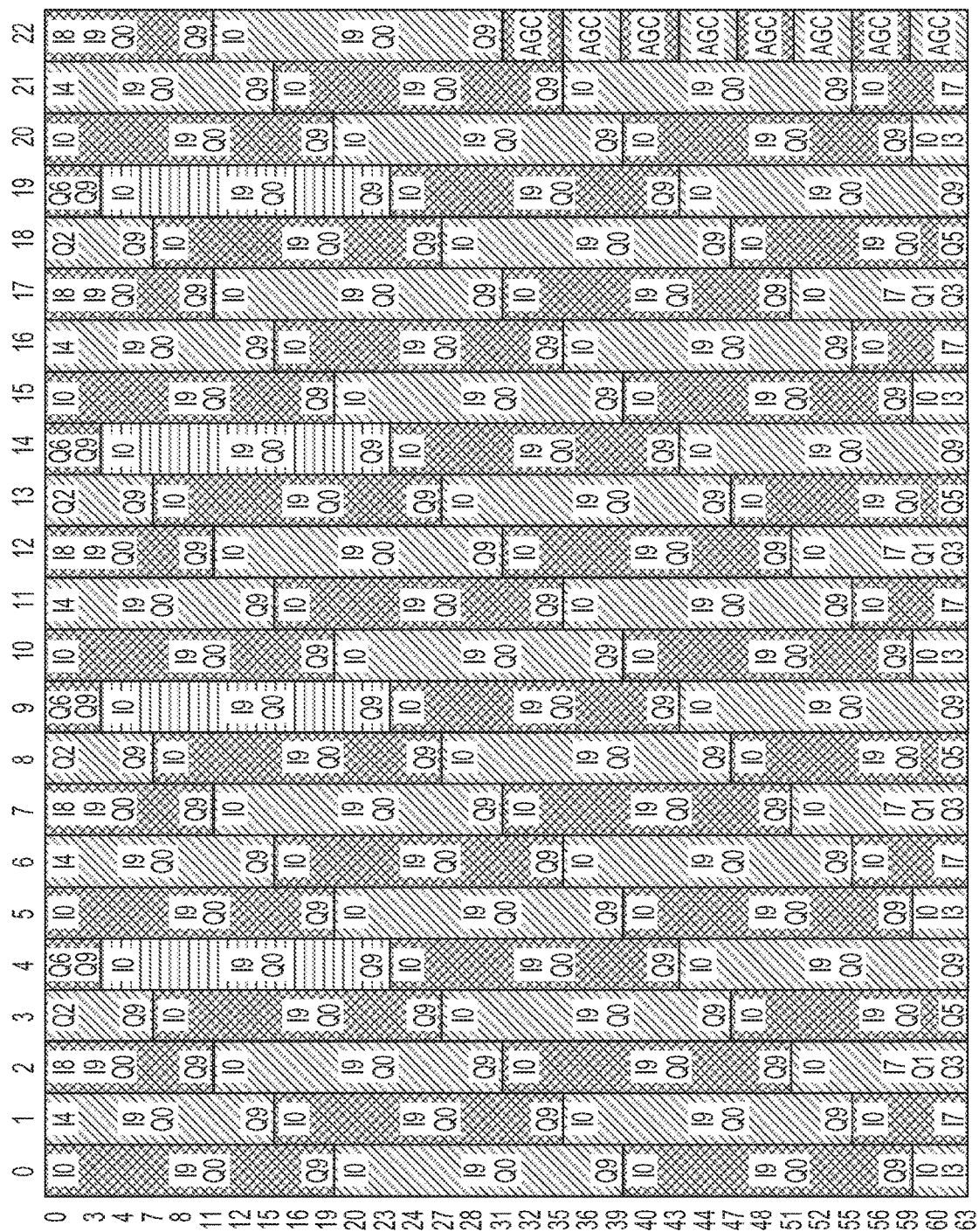
FIG. 12 depicts examples of I/Q clusters for a configuration involving two antenna ports used for communicating I/Q samples using a digital multichannel interface according to one aspect of the present disclosure.

The I/Q streams can be grouped differently in the I/Q data streams based on the number of antenna ports used in the multichannel I/Q interface. For example, FIGS. 10-12 depict structures of I/Q clusters for 8, 4, and 2 antenna ports, respectively. Each I/Q cluster can include 72 I/Q samples. Each I/Q sample can include 20 bits (10 bits for I data and 10 bits for Q data). The I/Q clusters can also include 8 adaptive gain control ("AGC") information elements (e.g., 4 bits each). Each cluster can include 8 I/Q sets. Each I/Q set can include 9 I/Q samples and 1 AGC information element. The distribution of I/Q samples and AGC information elements is depicted via the different shades in FIGS. 10-12.

For 8 antenna ports, there may be one AGC information element per antenna port per I/Q cluster, as seen in FIG. 10. FIG. 11 depicts the grouping of I/Q clusters for 4 antenna ports. With 4 antenna ports, the first four AGC information elements may be valid for the I/Q samples in the first half of the I/Q cluster, and the remaining four AGC information elements may be valid for the I/Q samples in the second half of the I/Q cluster. Similarly, FIG. 12 depicts the I/Q clusters for a configuration involving 2 antenna ports. For this configuration, the AGC gain can be applied to a quarter of I/Q samples each.

Figure 13:
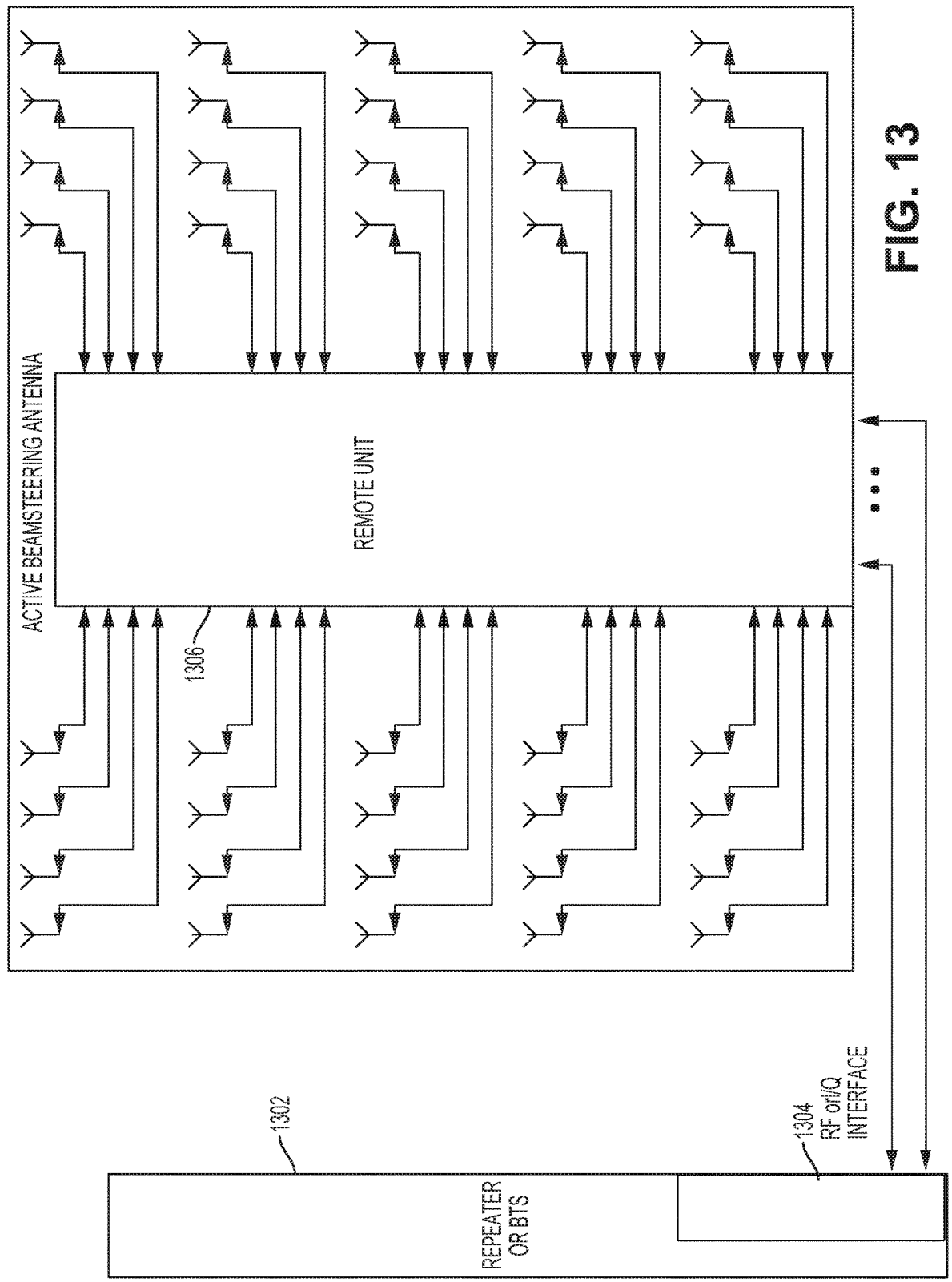
FIG. 13 is a block diagram that depicts an example of a repeater or a base station with a multiband, multiport I/Q interface coupled to a remote unit configured as an active beam-steering antenna according to one aspect of the present disclosure.

In some aspects, one or more of the remote units 906*a-b* shown in FIG. 9 can be configured as an active beam-steering antenna. FIG. 13 is a block diagram of a repeater or a base station 1302 with a multiband, multiport I/Q interface 1304 coupled to a remote unit 1306 configured as an active beam-steering antenna. The remote unit 1306 can be a multiband, multiport radio unit configured for dual polarization vertical and horizontal beam-steering.

When the remote unit 1106 is configured as a beam-steering antenna, any beam-steering control information can be included and provided via the multi-channel I/Q interfaces shown in FIG. 8. Through beam-steering, the remote unit 1306 can direct the direction of radiation of transmitted RF signals The active beam-steering antenna can be used for dual polarization of vertical and horizontal beam-steering. The active beam-steering antenna can include multiple antenna arrays for the polarization. For example, the active beam-steering antenna can include two antenna arrays, each including five sets of four antenna elements. Multiple antenna arrays for polarization can allow the remote unit 1306 to receive and detect both horizontally and vertically polarized RF signals at different polarizations. The active beam-steering antenna can also receive signals at different angles of arrival.

These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

What is claimed is:

1. A digital multichannel interface for a first unit of a radio distribution system, the digital multichannel interface comprising:
a first uplink interface configured to:
receive uplink transmit frames from a second unit of the radio distribution system, the uplink transmit frames including frame timing information, the radio distribution system including a plurality of remote units communicatively coupled to at least one of the first unit or the second unit; and
a first downlink interface configured to:
generate a plurality of reformatted wideband downlink I/Q data streams based on the frame timing information extracted from the uplink transmit frames received from the second unit;
generate downlink transmit frames including the plurality of reformatted wideband downlink I/Q data streams; and provide the downlink transmit frames to the second unit.

2. The digital multichannel interface for the first unit of claim 1, wherein the first uplink interface is configured to provide a plurality of reformatted wideband uplink I/Q data streams extracted from the uplink transmit frames received by the second unit to a first unit baseband unit via a digital front end.

3. The digital multichannel interface for the first unit of claim 2, wherein the first downlink interface is configured to generate the plurality of reformatted wideband downlink I/Q data streams by scaling and sampling a plurality of raw wideband downlink I/Q data streams received from the first unit baseband unit via the digital front end, and
wherein the second unit includes a second downlink interface configured to extract the frame timing information from the downlink transmit frames, extract the plurality of reformatted wideband downlink I/Q data streams from the downlink transmit frames, provide the frame timing information to a second uplink interface, and provide the plurality of reformatted wideband downlink I/Q data streams to one or more remote units configured to provide the plurality of reformatted wideband downlink I/Q data streams to user equipment devices.

4. The digital multichannel interface for the first unit of claim 3, wherein the second uplink interface includes a frame clock generator configured to generate uplink framing clock signals at a pre-determined clock rate, the uplink framing clock signals including the frame timing information.

5. The digital multichannel interface for the first unit of claim 4, wherein the first downlink interface includes a multiplexer configured to synchronize the downlink transmit frames and the uplink transmit frames based on the frame timing information.

6. The digital multichannel interface for the first unit of claim 4, wherein the second unit is configured to measure a time delay between the uplink framing clock signals generated at the frame clock generator and downlink framing clock signals provided by the second downlink interface, and wherein the first downlink interface or the first uplink interface is configured to compensate for the time delay.

7. The digital multichannel interface for the first unit of claim 1, wherein the first unit includes multiple sectors of antenna ports, each sector of the multiple sectors configured to transmit signals at a different frequency from other sectors of the multiple sectors.

8. The digital multichannel interface for the first unit of claim 1, wherein the second unit is configured to transmit the downlink transmit frames to an active beam- steering antenna configured to receive signals at horizontal and vertical polarization at different polarizations and different angles of arrival.

9. A digital multichannel interface for a first unit of a radio distribution system, comprising:
a first downlink interface configured to:
receive downlink transmit frames from a second unit of a radio distribution system, the downlink transmit frames including frame timing information, the radio distribution system including a plurality of remote units communicatively coupled to at least one of the first unit or the second unit; and
a first uplink interface configured to:
generate a plurality of reformatted wideband uplink I/Q data streams based on frame timing information extracted from the downlink transmit frames received from the second unit;

generate uplink transmit frames including the plurality of reformatted wideband uplink I/Q data streams; and provide the uplink transmit frames to the second unit.

10. The digital multichannel interface for the first unit of claim 9, wherein the first downlink interface is configured to receive the downlink transmit frames including a plurality of reformatted wideband downlink I/Q data streams and the frame timing information from a second downlink interface in the second unit, provide downlink framing clock signals including the frame timing information to the first uplink interface, and provide the plurality of reformatted wideband downlink I/Q data streams to one or more remote units via a first I/Q interface, the one or more remote units configured to provide the plurality of reformatted wideband downlink I/Q data streams to user equipment devices.

11. The digital multichannel interface for the first unit of claim 10, wherein the first uplink interface includes a multiplexer configured to synchronize the downlink transmit frames and the uplink transmit frames based on the frame timing information.

12. The digital multichannel interface for the first unit of claim 10, wherein the second downlink interface includes a frame clock generator configured to generate framing clock signals at a pre-determined clock rate, the framing clock signals including the frame timing information.

13. The digital multichannel interface for the first unit of claim 10, wherein the first unit is configured to communicate the plurality of reformatted wideband uplink I/Q data streams and the plurality of reformatted wideband downlink I/Q data streams with a second unit including multiple sectors of antenna ports, each sector of the multiple sectors configured to transmit signals at a same frequency or a different frequency from other sectors of the multiple sectors.

14. The digital multichannel interface for the first unit of claim 10, wherein the first unit is configured to transmit the downlink transmit frames to an active beam- steering antenna.

15. A method, comprising:

generating, at a first downlink interface of a first unit of a radio distribution system, a plurality of reformatted wideband downlink I/Q data streams;

receiving, at the first downlink interface, a framing clock signal including frame timing information generated at a second unit of the radio distribution system, the radio distribution system including a plurality of remote units communicatively coupled to at least one of the first unit or the second unit;

generating downlink transmit frames including multiplexing the plurality of reformatted wideband downlink I/Q data streams according to the frame timing information included in the framing clock signal; and transmitting the downlink transmit frames to the second unit.

16. The method of claim 15, further comprising:

extracting, at a second downlink interface included in the second unit, the plurality of reformatted wideband downlink I/Q data streams and the frame timing information from the downlink transmit frames;

transmitting the plurality of reformatted wideband downlink I/Q data streams to a first I/Q interface; and transmitting downlink framing clock signals including the frame timing information to a second uplink interface included in the second unit.

17. The method of claim 16, further comprising;

generating, at the second uplink interface, uplink framing clock signals including the frame timing information;

receiving the downlink framing clock signals from the second downlink interface; and measuring a time delay between the uplink framing clock signals and the downlink framing clock signals.

18. The method of claim 15, further comprising:

generating, at the second unit, uplink transmit frames including reformatted wideband uplink I/Q data streams according to the frame timing information included in the framing clock signal, wherein the downlink transmit frames and the uplink transmit frames are synchronized based on the frame timing information.

19. The method of claim 15, further comprising transmitting, from the second unit, the downlink transmit frames to an active beam-steering antenna.

20. The method of claim 15, wherein the downlink transmit frames are transmitted to the second unit via a plurality of sectors of antenna ports, each sector of the plurality of sectors transmitting signals at a same frequency or a different frequency from other sectors of the plurality of sectors.

* * * * *